(12) United States Patent
Grajewski et al.

(10) Patent No.: US 12,415,683 B2
(45) Date of Patent: Sep. 16, 2025

(54) SYSTEMS, METHODS, AND APPARATUSES FOR LOADING, ROTATING, AND TRANSFERRING OBJECTS IN AN AUTOMATED OR SEMI-AUTOMATED FASHION

(71) Applicant: United Parcel Service of America, Inc., Atlanta, GA (US)

(72) Inventors: Ryan Grajewski, Atlanta, GA (US); Julian Bell, Atlanta, GA (US); Julio Gil, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/437,015

(22) Filed: Feb. 8, 2024

(65) Prior Publication Data

US 2024/0270506 A1     Aug. 15, 2024

Related U.S. Application Data

(60) Provisional application No. 63/484,117, filed on Feb. 9, 2023.

(51) Int. Cl.
    *B65G 47/244*     (2006.01)

(52) U.S. Cl.
    CPC ................ *B65G 47/244* (2013.01)

(58) Field of Classification Search
CPC .......... B23Q 7/165; B23Q 7/18; B65G 47/24; B65G 47/22; B65G 47/244; B65G 47/252; B65G 47/248; B65G 59/08; B65G 65/23; B65G 47/846; B65G 17/123; B65G 47/847; B65G 29/00; B65G 17/26; B65H 2301/33214; B65H 2301/33212; B65H 2301/33216; B27B 31/04; B65B 35/58; B65B 35/56
USPC .................. 198/403, 416, 402, 473.1, 475.1; 414/774, 775, 778, 779, 780, 784, 772, 414/763, 767; 53/446, 544; 271/185
See application file for complete search history.

(56) References Cited

U.S. PATENT DOCUMENTS 4,524,680 A * 6/1985 Jeanrat ................... C12G 1/062
    414/754
4,573,863 A * 3/1986 Picotte ................. B65G 47/252
    414/763

(Continued)

*Primary Examiner* — Gregory W Adams
(74) *Attorney, Agent, or Firm* — Shook, Hardy & Bacon L.L.P.

(57) ABSTRACT

Various embodiments described herein provide apparatuses, systems, methods, technologies, and/or the like for loading, re-orienting, and/or transferring objects in an automated or semi-automated fashion. Accordingly, various embodiments enable such automated and/or semi-automated loading, re-orienting, and/or transferring of objects in different environments such as mobile environments, stationary environments, and/or the like. Various embodiments involve a supply apparatus that is used to load objects onto a re-orienting apparatus. Additionally, or alternatively, various embodiments involve a re-orienting apparatus that is used to rotate objects from an initial orientation to a desired orientation. Additionally, or alternatively, various embodiments involve a pushing mechanism that is used to transfer objects from a re-orienting apparatus to a downstream apparatus.

20 Claims, 13 Drawing Sheets

(56) References Cited

U.S. PATENT DOCUMENTS

| | | | | |
|---|---|---|---|---|
| 4,941,798 | A * | 7/1990 | Meier | B66C 1/24 |
| | | | | 294/93 |
| 5,209,629 | A * | 5/1993 | Rasmussen | B65H 15/02 |
| | | | | 414/774 |
| 6,059,520 | A * | 5/2000 | Adams | B65G 47/252 |
| | | | | 414/800 |
| 6,453,645 | B1 * | 9/2002 | Suokas | B65B 25/141 |
| | | | | 198/374 |
| 6,547,511 | B1 * | 4/2003 | Adams | B65G 61/00 |
| | | | | 414/789.2 |
| 7,516,601 | B2 * | 4/2009 | Horiuchi | B65H 39/10 |
| | | | | 53/540 |
| 8,931,618 | B2 * | 1/2015 | Walsh | B65H 31/309 |
| | | | | 270/39.02 |
| 2021/0245989 | A1 * | 8/2021 | Ackermann | B65H 31/3045 |

* cited by examiner

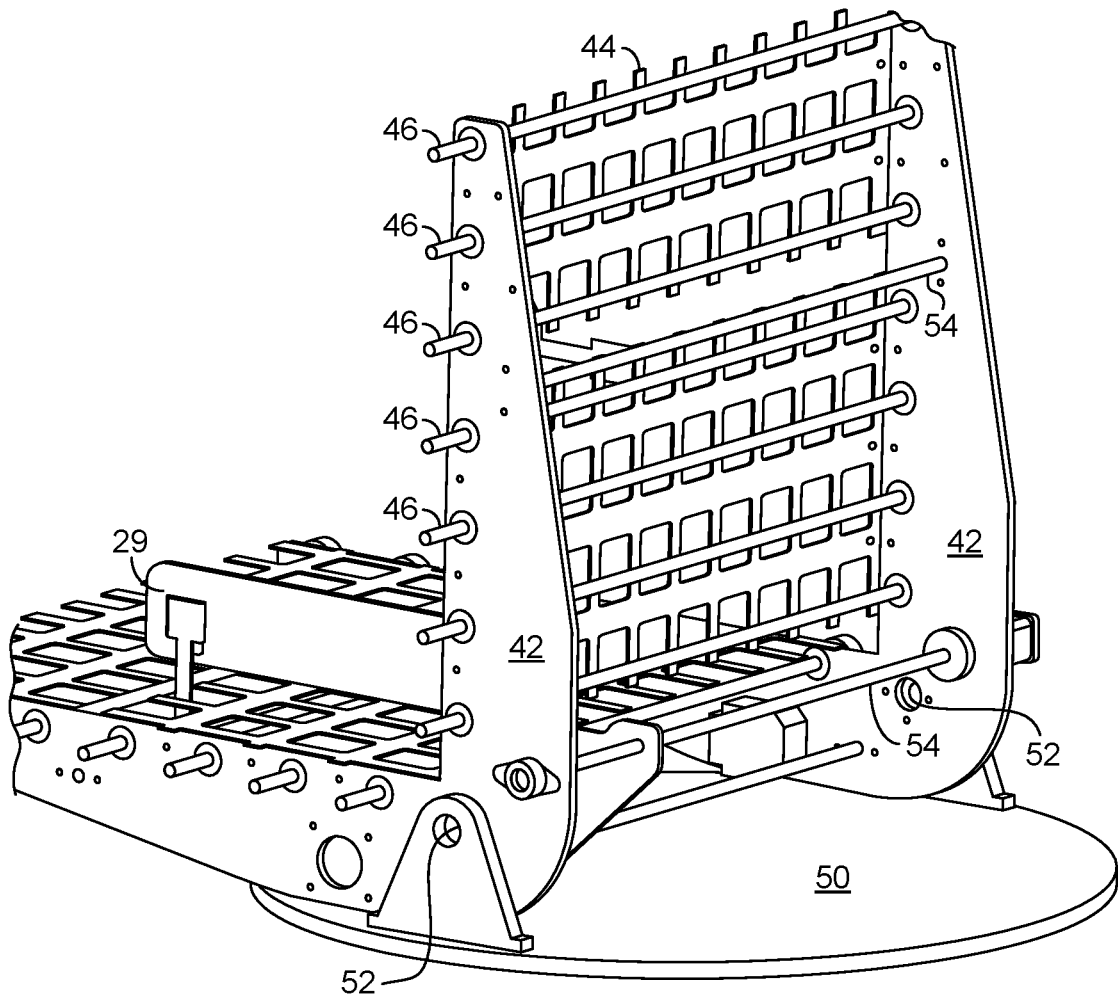
Fig. 4
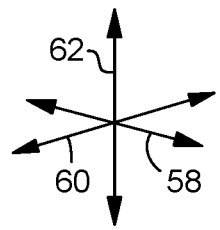

SYSTEMS, METHODS, AND APPARATUSES FOR LOADING, ROTATING, AND TRANSFERRING OBJECTS IN AN AUTOMATED OR SEMI-AUTOMATED FASHION

CROSS REFERENCE TO RELATED APPLICATIONS

This application claims priority from U.S. Provisional Patent Application Ser. No. 63/484,117, filed Feb. 9, 2023, the disclosure of which is hereby incorporated herein by reference in its entirety.

BACKGROUND

There is often a need to load, rotate, and transfer objects accurately, efficiently, and repeatedly. For example, an important aspect of running logistics network operations is to have the ability to load, rotate, and transfer parcels accurately, efficiently, and repeatedly. Conventionally, various tasks that involve loading, rotating, and transferring parcels within a logistics network operations are performed manually to ensure such accuracy, efficiency, and repeatability. However, reliance on manual handling can inherently limit the capacity, precision, and efficiency of such operations. Thus, improvements in automated or semi-automated systems, methods, apparatuses, etc., used in loading, rotating, and/or transferring objects are needed.

SUMMARY

This summary is intended to introduce a selection of concepts in a simplified form that is further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, systems, methods, and apparatuses for shifting, such as loading, rotating, and/or transferring, objects in an automated or semi-automated fashion in different operating environments. For example, the environment may be a storage trailer that attaches to a vehicle, a stationary facility associated with logistics network operations, and/or the like. Accordingly, various embodiments of the disclosure described herein may increase the efficiency, capacity, and/or precision of object handling in various operating environments, among other benefits.

In various aspects, re-orienting apparatuses are provided that operate to initiate rotation of objects about different axes in an automated and/or semi-automated fashion. For example, a re-orienting apparatus is provided that comprises a base rotatable about a first axis of rotation and a frame coupled to the base that is rotatable in different orientations about a second axis of rotation that is substantially perpendicular to the first axis of rotation. In particular embodiments, the frame may comprise a plurality of angled support structures. Additionally, or alternatively, the re-orienting apparatus may comprise a first actuator coupled to the base and operable to rotate the base about the first axis of rotation. Additionally, or alternatively, the re-orienting apparatus may comprise a second actuator coupled to the frame and operable to rotate the frame about the second axis of rotation. Additionally, or alternatively, the re-orienting apparatus may comprise a pushing mechanism coupled to the plurality of angled support structures and operable to extend and retract a pushing structure across surfaces of the plurality of angled support structures.

In certain embodiments, each angled support structure of the plurality of angled support structures comprises an array of roller mechanisms. For example, each roller mechanism of the array of roller mechanisms may comprise powered wheels and/or a powered roller that protrudes through an opening of the surface of the angled support structure and is operable to shift an object in one or more directions across the surface of the angled support structure. Further, in particular embodiments, the re-orienting apparatus may comprise a pivot-connection located at a junction between each of the plurality of angled support structures. The pivot-connection may allow the frame to rotate through operation of the second actuator about the second axis of rotation. Additionally, or alternatively, the re-orienting apparatus may comprise a guide rail extending between ends of the pivot-connection that is configured to allow the pushing mechanism to operate to extend and retract the pushing structure across the surfaces of the plurality of angled support structures while being stabilized and linearly guided by the guide rail.

Further, in various aspects, systems are provided for shifting, such as loading, rotating, and/or transferring, objects in an automated or semi-automated fashion in different operating environments. For example, a system is provided that comprises a loading apparatus, a re-orienting apparatus, and a control system. In particular embodiments, the re-orienting apparatus may comprise a base rotatable about a first axis of rotation and a frame coupled to the base that is rotatable in different orientations about a second axis of rotation that is substantially perpendicular to the first axis of rotation. In certain embodiments, the frame may comprise a plurality of angled support structures. Additionally, or alternatively, the re-orienting apparatus may comprise a pushing mechanism coupled to the plurality of angled support structures and operable to extend and retract a pushing structure across surfaces of the plurality of angled support structures.

In particular embodiments, the loading apparatus is configured to transfer an object onto the surfaces of the plurality of angled support structures. Accordingly, the control system may be configured to instruct at least one of the base to rotate about the first axis of rotation or the frame to rotate about the second axis of rotation to place the object into a desired orientation, and upon placing the object in the desired orientation, instruct the pushing mechanism to extend the pushing structure across the surfaces of the plurality of angled support structures to shift the object off the surfaces. Additionally, or alternatively, each angled support structure of the plurality of angled support structures may comprise an array of roller mechanisms. Here, the control system may be configured to instruct the array of roller mechanisms to shift the object in one or more directions across the surface of the angled support structure to shift the object off the surfaces.

In some embodiments, the system may further comprise a metrology system proximate to the re-orientating apparatus and configured to detect an initial orientation of the object placed onto the surfaces of the plurality of angled support structures. Accordingly, at least one of the metrology system or the control system may be configured to determine a rotation sequence for the object based at least in part on the initial orientation. In addition, the control system may instruct at least one of the base to rotate about the first axis of rotation or the frame to rotate about the second axis of rotation to place the object into the desired orientation based at least in part on the rotation sequence.

In some embodiments, the system may comprise a bump bar coupled in spaced relation with the plurality of angled support structures. The bump bar may be positioned such that the object is tipped over by the bump bar once the object is shifted off the surfaces of the plurality of angled support structures. In some embodiments, the system may further comprise a mobile device configured to interact with the control system to direct operation of at least one of the loading apparatus or the re-orienting apparatus. In addition, in some embodiments, the system may comprise a downstream apparatus. For example, the object may be shifted off the surfaces of the plurality of angled support structures and onto the downstream apparatus. Further, the control system may be configured to operate the downstream apparatus. For example, the control system may be configured to operate the downstream apparatus to transfer the object from the downstream apparatus and at least one of into or onto a mobile robotic platform. In addition, in various aspects, methods of operating the re-orienting apparatus, the loading apparatus, the downstream apparatus, the mobile robotic platform, and/or various components thereof are provided.

The term "mobile robotic platform," as used herein, should be interpreted broadly to include any apparatus or configuration of components that is mobile and that can operate, at least partially, in an automated or semi-automated fashion. The mobile robotic platform may be one configured to perform "last distance delivery," e.g., to a recipient, e.g., in connection with logistics network operations. In addition, the mobile robotics platform described herein may be ground-based, aerial-based, and/or autonomously operated or at least partially autonomously operated. Examples of mobile robotic platforms contemplated herein include, without limitation, multi-leg robots (e.g., bi-leg, quad-leg, and the like), wheel-driven robots, track-driven robots, aerial drones, and others.

The term "logistics network operations," as used herein, should be interpreted broadly to include any combination of components, systems, technology, persons, and/or locations that operate in coordination with transporting objects, e.g., parcels with contents, to different destinations, e.g., from a shipping location to a delivery location.

BRIEF DESCRIPTION OF THE DRAWINGS

The present systems, methods, and apparatuses for loading, rotating, and/or shifting objects in an automated or semi-automated fashion are described in detail herein with reference to the attached drawing figures, which illustrate non-limiting examples of the disclosed subject matter, wherein:

FIGS. 3-5 depict one example re-orienting apparatus in accordance with various embodiments of the present disclosure;

DETAILED DESCRIPTION

Figure 1:
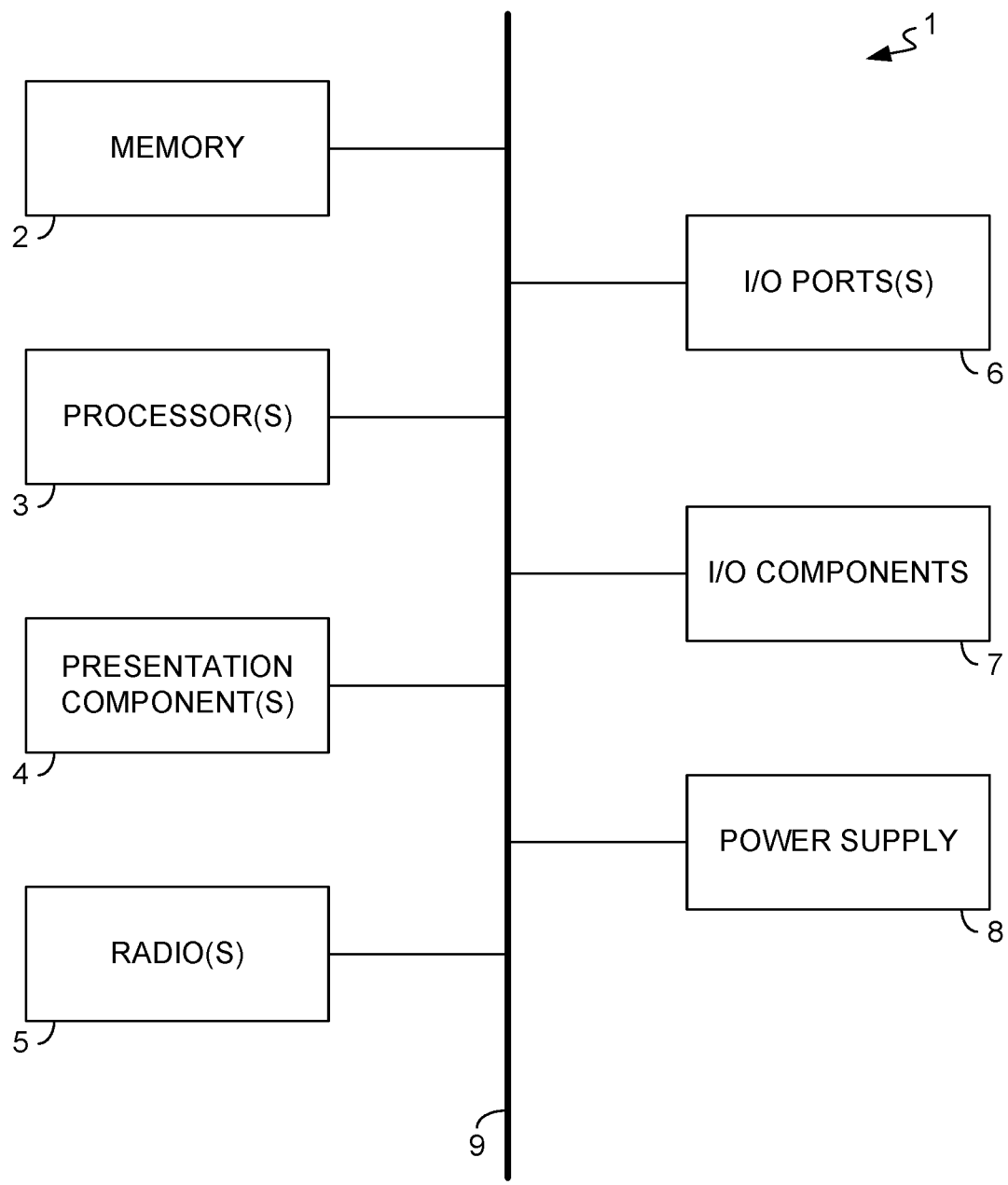
FIG. 1 depicts an example computing device suitable for supporting the operation of different embodiments described herein.

This detailed description is provided in order to meet statutory requirements. However, this description is not intended to limit the scope of the disclosure. Rather, the claimed subject matter may be embodied in other ways, including different steps, different combinations of steps, different features, and/or different combinations of features similar to those described in this disclosure and in conjunction with other present or future technologies or solutions. In addition, although the terms "step" and "block" may be used herein to identify different elements of methods employed, the terms should not be interpreted as implying any particular order among or between different elements except when the order is explicitly stated.

In general, various embodiments are described herein that enable and support the loading, rotating, and/or transferring of objects of different shapes and/or sizes, including in an automated or semi-automated fashion. For example, various embodiments described herein may be implemented in logistics network operations to improve the efficiency, capacity, and/or precision of handling objects in storage and/or sorting locations found within the logistics network operations, as well as during routing to designated destinations and/or recipients.

The subject matter described herein may be implemented as a method, a system, an apparatus, and/or a computer program product, among other things. Accordingly, certain aspects of various embodiments may take the form of hardware or software or may be a combination of software and hardware. A computer program that includes computer-executable instructions embodied on one or more computer-readable media may also be used. The subject matter described herein may further be implemented as hard-coded into the mechanical design of computing components and/or may be built into a system for loading, rotating, and/or transferring objects.

The computer-readable media described herein may include volatile media, non-volatile media, removable media, and non-removable media, and may also include media readable by a database, a switch, and/or other network devices. Network switches, routers, and related components are conventional in nature, as are methods of communicating with the same, and thus, further elaboration is not provided here. By way of example, and not limitation, computer-readable media may include computer storage media and/or non-transitory computer-readable media.

The computer storage media, or computer-readable media, described herein may include media implemented in any method or technology for storing information. Examples of stored information include computer-executable instructions, data structures, program modules, and/or other data representations. Computer storage media and/or computer-readable media may include, but is not limited to, Random Access Memory (RAM), Read Only Memory (ROM), Electrically Erasable Programmable Read-Only Memory (EE- PROM), flash memory, or other technology, Compact Disc Read-Only Memory (CD-ROM), digital versatile discs ("DVDs"), holographic media or other optical disc storage, magnetic cassettes, magnetic tape, magnetic disk storage, and other storage devices. These memory components may store data momentarily, temporarily, and/or permanently, and are not limited to the examples provided herein.

Example Computing Device and Object-Handling System

Looking at FIG. 1, a block diagram of an example computing device 1 suitable for supporting different operations and functions described herein is provided in accordance with various embodiments of the present disclosure. It should be understood that while some components in FIG. 1 are depicted in the singular, they may be plural, and/or the components may be connected in a different, e.g., local or distributed, configuration. For example, the computing device 1 may include multiple processors and/or multiple memories. In FIG. 1, the computing device 1 includes a bus 9 that directly or indirectly connects different components together, including memory 2, processor(s) 3, presentation component(s) 4 (if applicable), radio(s) 5, input/output (I/O) port(s) 6, input/output (I/O) component(s) 7, and power supply 8.

The memory 2 may take the form of the memory components described herein. Thus, further elaboration will not be provided here, except that the memory 2 may include any type of tangible medium that is capable of storing information. For example, the memory 2 may take the form of a database that includes any collection of records, data, and/or other information. In some embodiments, the memory 2 may include a set of computer-executable instructions that, when executed, perform different functions or steps described herein. These instructions will be referred to as "instructions," a "module," and/or an "application" for short. In some embodiments, the processor 3 may be a single processor or multiple processors that receive instructions and process them in furtherance of additional functions and operations.

The presentation component 4 may include a display, a speaker, a screen, a portable digital device, and/or other components that can present information through visual, auditory, and/or other tactile cues (e.g., a display, a screen, a lamp, a light-emitting diode [LED], a graphical user interface [GUI], and/or a lighted keyboard). The radio 5 may support communications over a network, and may additionally or alternatively support or facilitate different types of wireless communications, such as Wireless Fidelity (Wi-Fi), Worldwide Interoperability for Microwave Access (WiMAX), Long Term Evolution (LTE), Bluetooth, and/or Voice Over Internet Protocol (VoIP) communications, among other communication protocols. In particular embodiments, the radio 5 may be configured to support multiple technologies, and/or multiple radios may be configured and utilized to support multiple technologies.

The input/output (I/O) ports 6 may take a variety of forms. For example, the I/O ports may include a USB jack, a stereo jack, an infrared port, and/or other proprietary communication ports. The input/output (I/O) components 7 may comprise one or more keyboards, microphones, speakers, touchscreens, and/or any other item useable to directly or indirectly input data into the computing device 1. The power supply 8 may include electrical sources, batteries, generators, fuel cells, and/or other components that may act as a power source to supply power to the computing device 1 and to other components described herein.

Figure 2:
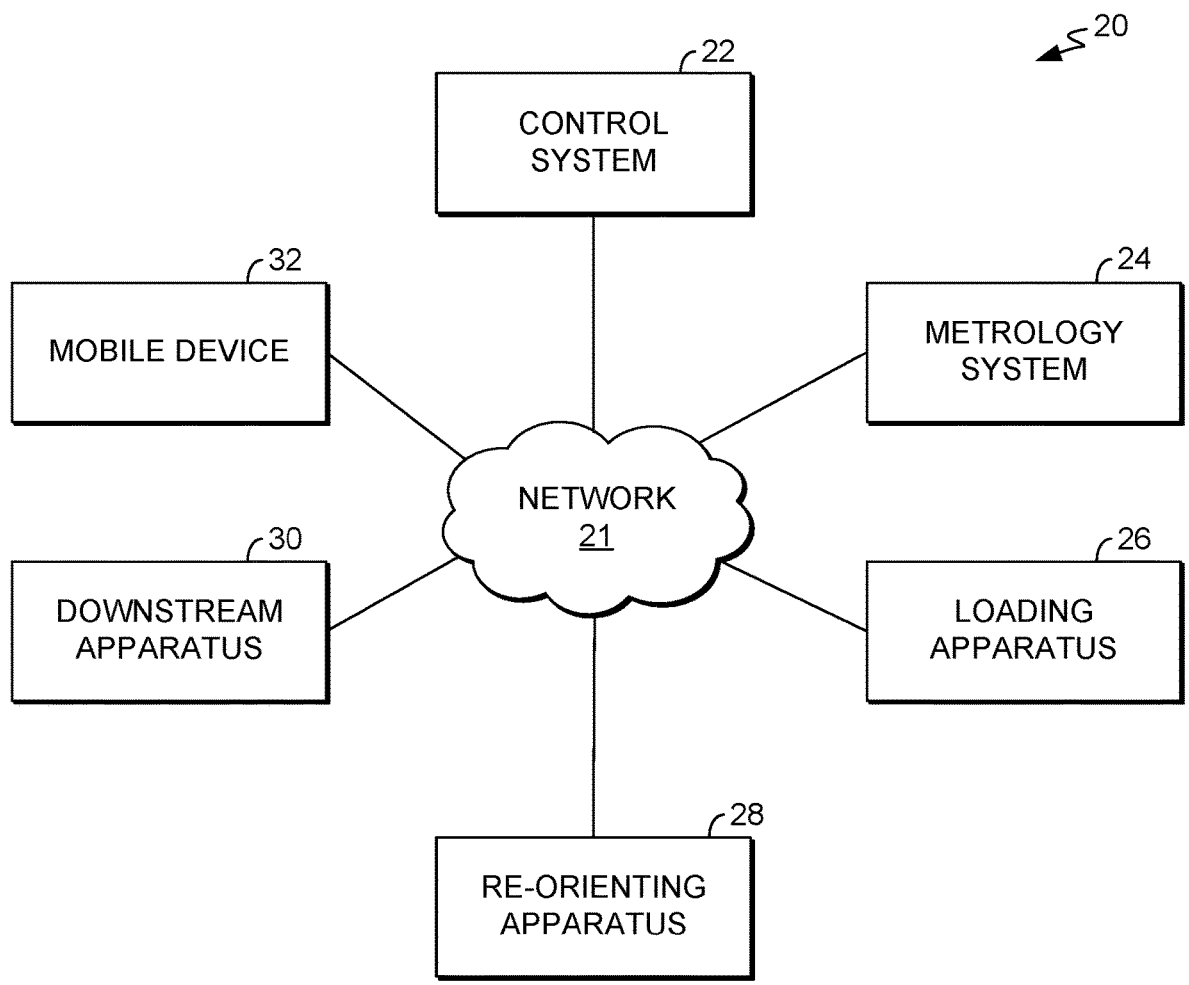
FIG. 2 depicts a diagram with an example object-handling system that includes a selection of interconnected components that can support different loading, rotating, and/or shifting operations described herein in accordance with various embodiments of the present disclosure.

Looking at FIG. 2, an object-handling system 20 is provided in accordance with various embodiments of the present disclosure that includes a non-limiting configuration of components 22, 24, 26, 28, 30, 32, 34 interconnected over a network 21. The components 22, 24, 26, 28, 30, 32, 34 are shown in generic form for clarity, simplicity, and explanation purposes. In actual implementation, the components 22, 24, 26, 28, 30, 32, 34 may include additional structures, features, technologies, and/or the like that enable and support their operation and functionality. The configuration of components 22, 24, 26, 28, 30, 32, 34 shown in FIG. 2 is intended to represent one non-limiting example, and numerous other configurations are contemplated as within the scope of the present disclosure.

In various embodiments, the components 22, 24, 26, 28, 30, 32, 34 may operate independently and/or in coordination to facilitate loading, rotating, transferring, and/or otherwise shifting or manipulating objects (e.g., parcels or packages) in different operating environments. For example, the object-handling system 20 may include a control system 22 that monitors, controls, and/or directs the operation of one or more of the components 24, 26, 28, 30, 32, 34 of the system 20 in an automated and/or semi-automated fashion. Depending on the embodiment, the control system 22 may individually control components 24, 26, 28, 30, 32, 34 or may control multiple components 24, 26, 28, 30, 32, 34 virtually simultaneously, thereby allowing them to operate in coordination (e.g., to perform tasks virtually simultaneously). In addition, the control system 22 may control the components 24, 26, 28, 30, 32, 34 locally, remotely, and/or through a distributed configuration. Accordingly, the control system 22 may include computing hardware, such as one or more of the computing device 1 shown in FIG. 1, configured locally, remotely, and/or through a distributed configuration to monitor, direct, and/or otherwise operate to control the components 24, 26, 28, 30, 32, 34 of the system 20 as described herein.

In various embodiments, the object-handling system 20 includes a metrology system 24. For example, the object-handling system 20 may include a metrology system 24 that is located in a storage space inside of an environment such as a stationary location, a mobile transport, and/or the like. The metrology system 24 may include components that allow the system 24 to identify characteristics of an object being manipulated by the object-handling system 20. For example, the metrology system 24 may include sensors (e.g., optical sensors), processors, memories, communication components, optical/imaging systems, and/or other elements that allow the system 24 to profile objects located in a three-dimensional space in which the object-handling system 20 operates. More specifically, the metrology system 24 may include elements that are used to detect the dimensions of an object, relative dimensions of an object, a shape of an object, an orientation of an object, and/or a position of an object relative to other components of the object-handling system 20 and/or relative to other objects located in the object-handling system 20.

Additionally, or alternatively, the metrology system 24 may identify the object itself and/or markings on the object that depict a preferred orientation of the object (e.g., "this side up" label). In some embodiments, the metrology system 24 and/or control system 22 may include and/or use logic that allows the metrology system 24 and/or control system 22 to determine a rotation sequence for a particular object. For example, the metrology system 24 and/or control system 22 may determine a rotation sequence that comprises translations (e.g., a series of tilts, axial rotations, and/or the like) that allow the object to be rotated from an initial orientation to a desired orientation (e.g., an orientation suitable for transfer of the object into a storage space and/or onto a downstream apparatus 30 such as a conveyor, a mobile robotic platform 80 used for subsequent transport of the object, and/or the like).

Here, the metrology system 24 and/or control system 22 may execute logic based on one or more detected characteristics of the object in generating a rotation sequence to place the object from a current (initial) orientation to a desired orientation. For example, the metrology system 24 and/or control system 22 may execute logic that determines a rotation sequence for the object, given a specific incoming orientation of the object. As an illustrative example, the metrology system 24 may detect an incoming (initial) orientation that indicates the object travelling axially along a conveyor having dimensions width, length, and height. The metrology system 24 and/or control system 22 may then execute logic that returns a rotation sequence that can be performed to release the object with a desired orientation having dimensions length, width, and height. In particular embodiments, the logic may be configured with the goal being to find a rotation sequence with a minimum number of transitions that are needed to result in a desired orientation correlating to further downstream processing of the object.

As noted, the metrology system 24 may detect one or more characteristics of the object that assist in identifying a rotation sequence. For example, the metrology system 24 may detect a label placed on the object, as well as a current orientation of the certain side. Here, the label may indicate that the certain side of the object should be facing up, and/or the label is desired to be facing up so that it is visible during further processing of the object. The metrology system 24 and/or control system 22 may use these detected characteristics in generating a rotation sequence to perform a series of transitions to place the certain side of the object facing up.

In another example, the metrology system 24 may detect one or more dimensions of the objects that are used in generating a rotation sequence. For example, the desired orientation of the object may be to have a narrow side of the object facing down so that the object is able to slide into a narrow slot. The metrology system 24 may detect a current orientation of the narrow side of the object, and the metrology system 24 and/or control system 22 may use this detected characteristic in generating a rotation sequence to perform a series of transitions to place the narrow side of the object facing down.

The metrology system 24 may use one or more sensors in detecting characteristics of the object. For example, the metrology system 24 may use one or more weight sensors to detect a center of gravity of the object. The desired orientation of the object may be to have the heaviest side of the object facing down to make the object more stable. Therefore, the metrology system 24 and/or control system 22 may use this detected characteristic in generating a rotation sequence to perform a series of transitions to place the heaviest side of the object facing down.

Additionally, or alternatively, the metrology system 24 may monitor the object and determine whether the object has slid out and/or moved out of a desired position from what is required for further manipulation of the object. The metrology system 24 and/or control system 22 may use such detection in generating a rotation sequence to perform a series of transitions to place the object back into the desired position.

Additionally, or alternatively, the metrology system 24 may utilize and/or apply different techniques when determining measurements associated with an object. For example, the metrology system 24 may utilize and/or apply techniques that involve taking measurements based at least in part on utilizing a laser that is blocked by the object when the object is placed in a re-orienting apparatus 28, utilizing photo resistors placed along a face of a re-orienting apparatus 28, utilizing three-dimensional (3D) camera vision sensors, utilizing stereo vision capable of detecting depth, and/or the like. Additionally, or alternatively, the metrology system 24 may detect when a jam has occurred during an object-orienting process and, for example, communicate the jam (e.g., jamming error) to the control system 22. Additionally, or alternatively, the metrology system 24 may communicate the progress of loading, rotating, transferring, and/or otherwise shifting or manipulating an object to the control system 22 during an object-orienting process. For example, the metrology system 24 may communicate to the control system 22 of completion of each part of a rotation sequence.

In various embodiments, the object-handling system 20 includes a loading apparatus 26 that includes components configured for engaging, supporting, lifting, and/or translating/shifting an object in a stationary environment, such as a storage facility, sorting facility, and/or the like, or a mobile environment, such as a delivery vehicle, delivery trailer, and/or the like. For example, various configurations of the loading apparatus 26 may include components such as tracks, belts, rollers, pistons, guides, actuators, sensors, control components, power sources (e.g., electric, pneumatic, and/or hydraulic), and/or other components that support operation for engaging, supporting, lifting, and/or translating/shifting an object.

Additionally, or alternatively, the object-handling system 20 includes a re-orienting apparatus 28 that includes components configured for engaging, supporting, and/or rotating an object in a stationary environment and/or mobile environment. For example, the re-orienting apparatus 28 may include components that are operable to impart normal rotations, axial rotations, and/or perpendicular rotations of an object (e.g., rotations about an associated x, y, and/or z-axis). Accordingly, various configurations of the re-orienting apparatus 28 may include components such as support structures, actuators, sensors, control components, power components, shifting mechanisms (e.g., such as actuated rollers or pushers), and/or can include other mechanical, electrical, and/or pneumatic components that allow it to rotate an object into different orientations.

In particular embodiments, the loading apparatus 26 may be coupled, directly or indirectly, to the re-orienting apparatus 28 and used to transfer (e.g., shift) an object onto the re-orienting apparatus 28 for further manipulation. For example, the loading apparatus 26 may shift an object onto the re-orienting apparatus 28 to translate the object through a rotation sequence that orients the object into a desired orientation for downstream processing/transport. In some embodiments, the control system 22 may interface with the loading apparatus 26 and/or the re-orienting apparatus 28 to facilitate the shifting of the object to the re-orienting apparatus 28. Additionally, or alternatively, the loading apparatus 26 may interact directly with the re-orienting apparatus 28 via an interface to facilitate the shifting of the object to the re-orienting apparatus 28.

In various embodiments, the object-handling system 20 includes a downstream apparatus 30 that includes components configured for engaging, supporting, lifting, and/or translating/shifting an object that has been placed into a desired orientation for facilitating downstream processing and/or transporting of the object in a stationary and/or mobile environment. For example, various configurations of the downstream apparatus 30 may include components such as tracks, belts, rollers, pistons, guides, actuators, sensors, control components, power sources (e.g., electric, pneumatic, and/or hydraulic), and/or other components that support operation for engaging, supporting, lifting, and/or translating/shifting an object to facilitate downstream processing and/or transporting of the object. As illustrative examples, the downstream apparatus 30 may comprise a conveyor and/or a mobile robotic platform to facilitate further downstream transporting of an object within logistics network operations.

In particular embodiments, the downstream apparatus 30 may be coupled, directly or indirectly, to the re-orienting apparatus 28 in which the re-orienting apparatus 28 transfers (e.g., shifts) an object onto or into the downstream apparatus 30 for further processing and/or transport once the object has been placed into a desired orientation. In some embodiments, the control system 22 may interface with the downstream apparatus 30 and/or the re-orienting apparatus 28 to facilitate the shifting of the object from the re-orienting apparatus 28 to the downstream apparatus 30. Additionally, or alternatively, the downstream apparatus 30 may interact directly with the re-orienting apparatus 28 via an interface to facilitate the shifting of the object from the re-orienting apparatus 28 to the downstream apparatus 30.

In various embodiments, the object-handling system 20 includes a mobile device 32 that is used in connection with one or more of the components 22, 24, 26, 28, 30 of the system 20. For example, the object-handling system 20 may include a mobile device 32 configured to interact with the control system 22 to direct operation of one or more of the components 24, 26, 28, 30 of the object-handling system 20 to facilitate loading, rotating, transferring, and/or otherwise shifting or manipulating an object.

Example Re-Orienting Apparatus

Figure 3:
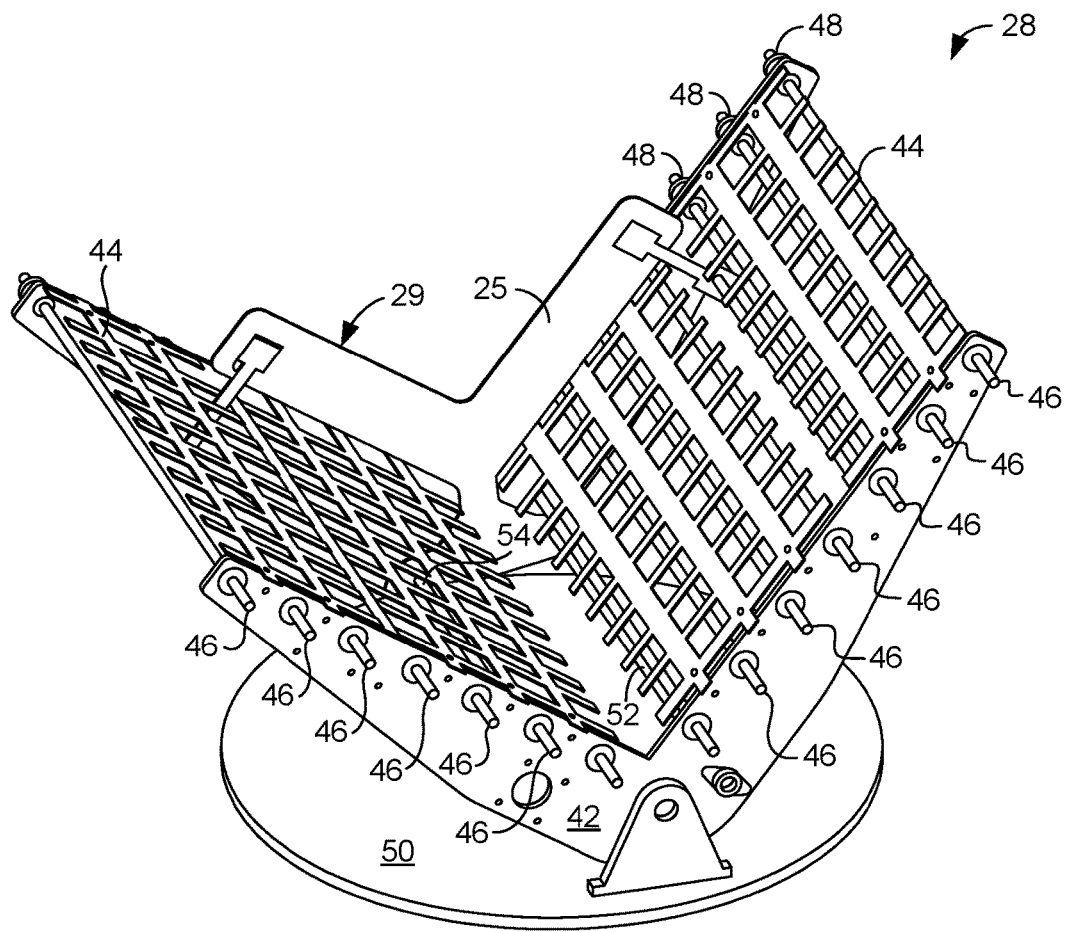
Figure 3:
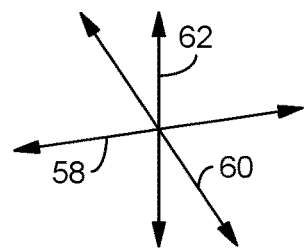
Figure 5:
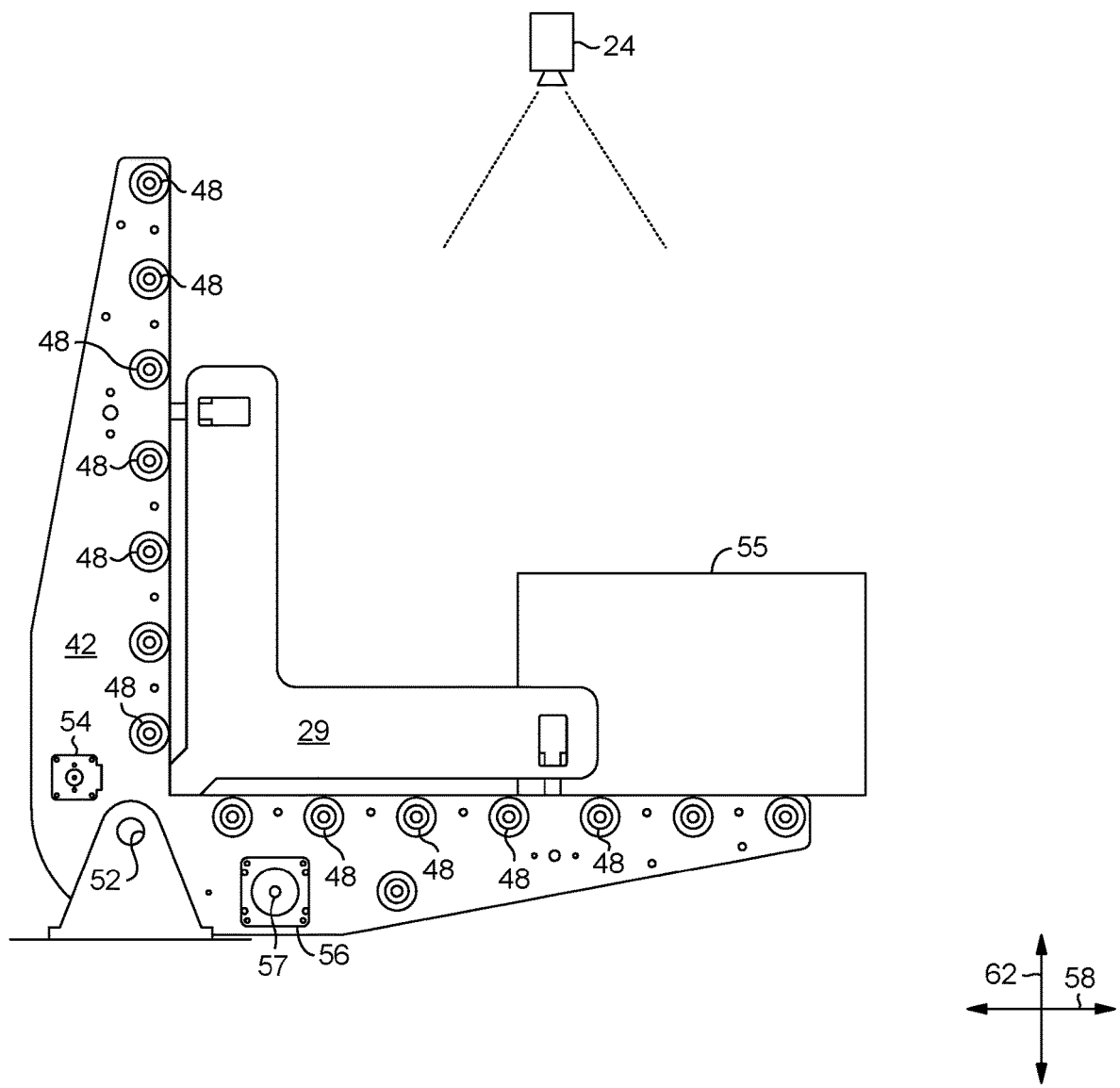

Turning now to FIGS. 3-5, an example re-orienting apparatus 28 is provided in accordance with various embodiments of the present disclosure that can be used for loading, re-orienting, and/or shifting an object into a desired orientation. For example, the re-orienting apparatus 28 may be positioned within an operating process adjacent to a loading apparatus 26, such as a conveyor, that transfers objects onto the re-orienting apparatus 28 so that the objects may be re-oriented to a desired orientation and transferred to a downstream apparatus 30 for further processing. In another example, a re-orienting apparatus 28 may be positioned/operated within a Cartesian gantry system (e.g., a three-axis robotic system) in a space where object shifting/re-orienting occurs. The Cartesian gantry system may have three axes suspended from a horizontal and/or vertical axis within the space on a rigid structure, and the Cartesian gantry system may utilize the re-orienting apparatus 28 to re-positioned objects that are obtained rather than transferred onto the re-orienting apparatus 28 from a loading apparatus 26.

As shown in FIG. 3, the re-orienting apparatus 28 includes a frame 42 with a pair of support structures 44. In particular embodiments, the support structures 44 may be angled to provide surfaces for supporting and/or cradling an object placed on the frame 42 while the object is being loaded, re-oriented, and/or shifted. Additionally, or alternatively, each support structure 44 may include an array of single or multi-directional roller mechanisms 46. For example, each support structure 44 may include an array of single or multi-directional roller mechanisms 46 in which each roller mechanism 46 comprises a powered wheel and/or roller that protrudes through an opening in the surface of the support structure 44 and translates in one or multiple directions to shift an object resting on the frame 42 in one or more directions. Depending on the embodiment, the array of single or multi-directional roller mechanisms 46 may have any suitable size, shape, number of roller mechanisms, and/or directional configurations. In addition, the wheel and/or roller may be single-directional or multi-/omni-directional, such as a mecanum wheel, cylindrical roller, and/or the like.

In particular embodiments, each of the roller mechanisms 46 may comprise a rotational drive unit that sets the roller mechanism 46 into rotation to transport, shift, adjust, or otherwise move an object. For example, looking at FIGS. 3 and 5, the rotational drive unit in particular embodiments may include a gear 48, which is located at the perimeter of the roller mechanism 46 near the edge of the frame 42, that is connected to an actuator that may comprise a drive belt assembly, one or more rotational actuators, and/or other suitable actuation components such as one or more electrical, mechanical, pneumatic, and/or hydraulic actuators located adjacent to the side(s) of the frame 42 and operable to rotate the roller mechanism 46. In some embodiments, the roller mechanisms 46 may be operated as a group, thereby allowing for controlled shifting of an object by the roller mechanisms 46 along the frame 42. In addition, each roller mechanism 46 may be oriented at a selected angle to control the trajectory of an object shifted along the frame 42 so that the object is shifted in a desired direction during operation.

In various embodiments, the re-orienting apparatus 28 includes a rotating base 50 that is operable to rotate the frame 42 about an axis 62 as identified in FIGS. 3-5. The frame 42 is coupled to the rotating base 50 such that it can be rotated into different orientations about the axis 62 using an actuator attached to the rotating base 50. For example, the actuator may comprise a rotational actuator attached to the rotating base 50 that is operable to impart rotational force to a shaft that, by association, rotates the frame 42. Depending on the embodiment, the frame 42 may be pivoted by the rotating base 50 anywhere from 90 to 360 degrees, including in opposite directions. The rotation of the frame 42 allows the support structures 44 to be rotated along with an object positioned thereon, thus allowing the object to be re-oriented. In addition, the rotation of the frame 42 may change the orientation of each array of the roller mechanisms 46, which may change the orientation of conveyance of the object placed on the re-orienting apparatus 28.

In addition, in various embodiments, the re-orienting apparatus 28 includes a pushing mechanism 29 with a pushing structure 25 that may be extended and/or retracted across the surfaces of the angled support structures 44. For example, the pushing structure 25 may be extended and/or retracted generally along the axis 60 as identified in FIG. 3. Once actuated, the pushing structure 25 moves along the surfaces of the angled support structures 44 to thereby linearly shift an object supported on the angled support structures 44 to allow the object to be transferred off of the re-orienting apparatus 28. Depending on the embodiment, an object may be transferred off of the re-orienting apparatus 28 using the arrays of roller mechanisms 46, gravity, the pushing mechanism 29, and/or some combination thereof.

Accordingly, the pushing mechanism 29 may be used for transferring an object from the re-orienting apparatus 28 to a downstream apparatus 30 such as a conveyor, handling device, a mobile robotic platform, and/or the like to facilitate routing and/or processing of the object. Once extended, the pushing structure 25 may linearly displace the object and then retract back to its original position where it can receive, support, and/or shift another object. In some embodiments, the pushing structure 25 may be arranged at an angle (e.g., instead of being arranged perpendicular to a pushing direction) to facilitate tipping an object over during the pushing process.

In some embodiments, the re-orienting apparatus 28 may incorporate weight-detecting and/or load-detecting sensors into, for example, the frame 42, that are used to measure a weight of a supported object, the center of gravity of a supported object, and/or a weight distribution of a supported object. This information may be used, for example, to facilitate desired shifting, rotation, and motion control during a rotation sequence.

In various embodiments, the re-orienting apparatus 28 may be used in connection with a metrology system 24, as shown in FIG. 5. The metrology system 24 may include optical sensors, lighting elements, processors, communication components, and/or the like. In these embodiments, the metrology system 24 may be used to detect characteristics of an object loaded onto the re-orienting apparatus 28. For example, the metrology system 24 may be used to detect characteristics such as the shape of the object, dimensions of the object, unique indicia associated with the object, an orientation of the object, and/or the like. Additionally, or alternatively, the metrology system 24 may be used to detect a rotation sequence of the object required to shift the object from an initial orientation to a desired orientation, for example, in a three-dimensional space where the re-orienting apparatus 28 operates.

Additionally, or alternatively, the metrology system 24 may be used to detect and interpret information associated with an object. Such information may be provided through visible and/or non-visible indicia, as well as unique identifying indicia. For example, the metrology system 24 may detect and interpret such information provided via barcodes, labels (e.g., "fragile" or "this side up"), radio frequency identification ("RFID") signals, and/or the like. In some embodiments, the information may be used in determining a rotation sequence for the object. For example, if an object contains a "this side up" label, then the metrology system 24 may detect a current orientation of the label on the object and based at least in part on the current orientation, the metrology system 24 and/or control system 22 may determine a rotation sequence for the object to establish an upward positioning of the label.

Looking specifically at FIG. 4, the opposite side of the re-orienting apparatus 28 is depicted, as compared to FIG. 3. FIG. 4 shows in more detail a pivot-connection 52 located at a junction between the angled support structures 44 of the frame 42. In addition, FIG. 4 shows the pushing mechanism 29. In various embodiments, the pivot-connection 52 may allow the frame 42 to rotate, for example, through the operation of an attached rotational actuator, generally about the axis 60.

In FIG. 4, a guide rail 54 is shown extending generally between ends of the pivot-connection 52. In various embodiments, the guide rail 54 may allow the pushing structure 25 to extend and/or retract along the frame 42 while being stabilized and linearly guided by the guide rail 54. Depending on the embodiment, different types of actuator assemblies may be used to enable the actuation of the pushing structure 25. For example, the pushing mechanism 29 may include a linear actuator that imparts a force to the pushing structure 25 to allow it to extend and/or retract along the frame 42 with its motion stabilized and guided by the guide rail 54. Additionally, or alternatively, a rotational actuator 56 may be attached to a lead screw 57 that is positioned opposite to the guide rail 54 as shown in FIG. 5. The pushing structure 25 may be coupled to threads of the lead screw 57 so that the rotational actuator 56 can be operated to rotate the lead screw 57, which then shifts the pushing structure 25 attached to the lead screw 57 along the frame 42 with the pushing structure 25 being similarly constrained and guided by the guide rail 54. Additionally, or alternatively, other mechanical, electrical, pneumatic, and/or hydraulic actuator assemblies may be use in shifting the pushing structure 25 into different positions. Yet, in other instances, the pushing mechanism 29 may be omitted, and an object may simply be shifted using the roller mechanisms 46.

In particular embodiments, the angled support structures 44 may be designed to pivot, independently and/or in unison, about their adjoined axis (e.g., the adjoined ends of the support structures 44 extending along axis 60), thus allowing either and/or both of the angled support structures 44 to rotate and lay substantially flat for a particular transfer process. For example, the angled support structures 44 may be able to pivot independently about the adjoined axis into a configuration where the support structures 44 are linearly aligned, laying at a substantially 180-degree angle.

Accordingly, when one of the support structures 44 is in a substantially flat orientation, the re-orienting apparatus 28 may be used to transport and/or transfer objects on or off of the re-orienting apparatus 28, either prior to or after re-orientation of the object. For example, the roller mechanisms 46 and/or pushing mechanism 29 may be operated to transfer an object to or from the re-orienting apparatus 28. Additionally, or alternatively, such lay-flat adaptability may allow for multiple object-transfer apparatuses 28 to be positioned adjacent to each other or in sequence to operate as either upstream or downstream apparatuses in a system for re-orienting/transferring objects.

In addition, in particular embodiments, the re-orienting apparatus 28 may include multiple (e.g., three or more) support structures 44 that may rotate relative to each other about multiple adjoined axes. For example, the re-orienting apparatus 28 may include a first support structure 44 that is pivotally coupled at a distal end thereof to a second support structure 44 that is pivotally coupled at a distal end thereof to a third support structure 44. The first, second, and third support structures 44 may be configured to be rotatable in unison, independently, and/or in some combination thereof to provide a re-orienting apparatus 28 that can adopt to multiple geometries for use in re-orienting and/or transferring objects. For example, such a configuration may enable the re-orienting apparatus 28 to shift its geometry in a "snakelike" movement.

Looking now at FIG. 5, the opposite side of the re-orienting apparatus 28 is depicted as compared to FIGS. 3 and 4. FIG. 5 further depicts the gears 48 positioned at the ends of the roller mechanisms 46. In various embodiments, the gears 48 may be interconnected with a pulley transmission assembly attached to a pulley motor, may be driven by a belt-driven assembly attached to a rotational actuator, and/or can be driven by individual rotational actuators. FIG. 5 further depicts an object 55, in this case a box, being transferred onto the re-orienting apparatus 28. Once transferred onto the re-orienting apparatus 28, the object 55 may be re-oriented through the rotation of the frame 42 about the pivot connection 52 (e.g., using an associated rotational actuator) and/or through the rotation of the frame 42 about the rotating base 50 (e.g., using an associated rotational actuator). Once re-oriented, the object 55 may then be shifted, for example, using the pushing structure 25 of the pushing mechanism 29 to shift the object 55 linearly off of the re-orienting apparatus 28 along the axis 60 as shown in FIG. 3.

Figure 6:
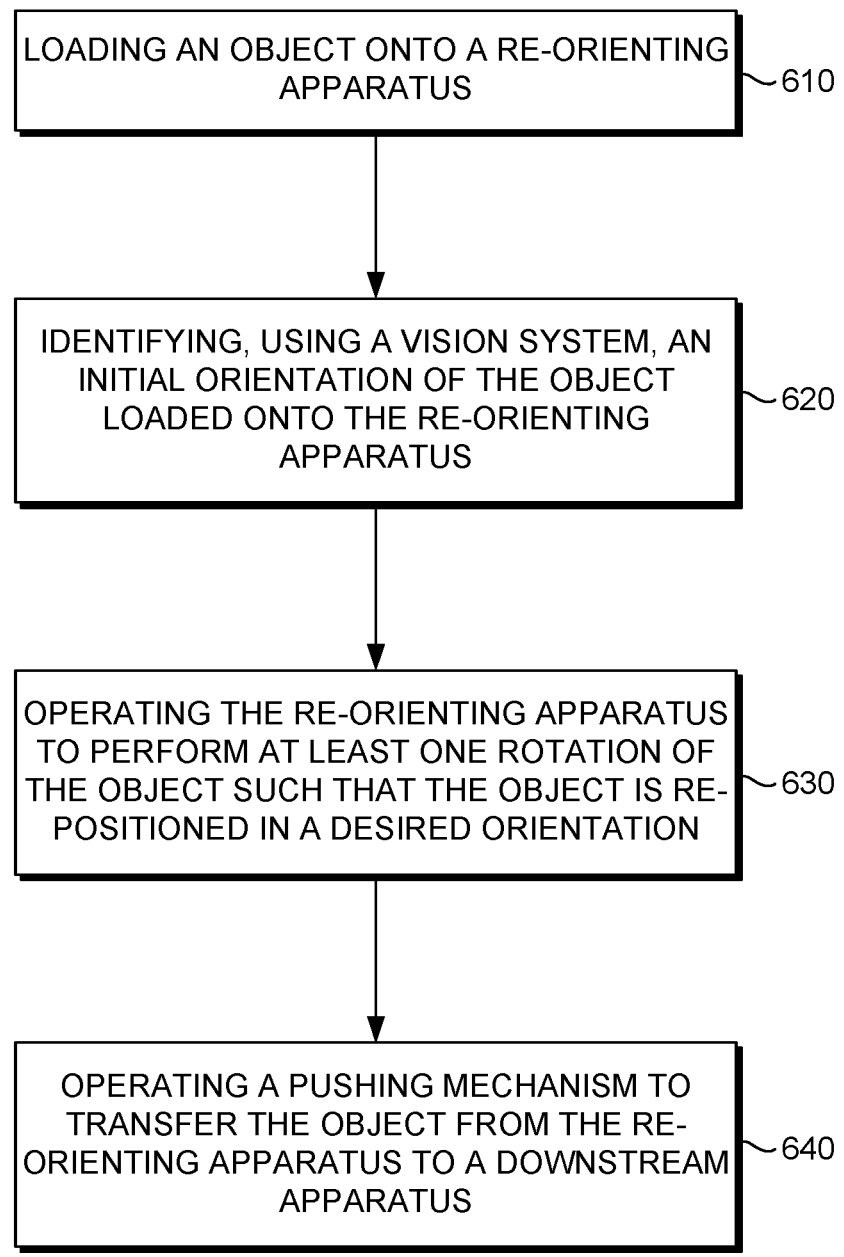
FIG. 6 depicts a block diagram of an example method of re-orienting an object, e.g., in connection with logistics network operations, in accordance with various embodiments of the present disclosure.

FIG. 6 provides a block diagram of an example method 600 of re-orienting an object, such as, for example, a package, parcel, item, product, and/or the like, in accordance with various embodiments of the present disclosure. The method 600 includes blocks 610-640, but is not limited to this combination of elements, or the order depicted. In block 610, the method 600 involves loading an object using a loading apparatus 26, such as, for example, a conveyor or other object-supply apparatus, onto the re-orienting apparatus 28. In block 620, the method 600 involves identifying, via a metrology system 24, an initial orientation of the object loaded onto the re-orienting apparatus 28. Additionally, or alternatively, the metrology system 24 and/or the control system 22 may identify a rotation sequence required to re-orient the object into a desired orientation.

For example, the metrology system 24 and/or the control system 22 may compare an initial orientation of the object with a desired orientation and calculate a minimum number of transitions (tilts, rotations, etc.) required to achieve the desired orientation. In many instances, there may be a number of different combinations of transitions that would place the object into the desired orientation. Here, the metrology system 24 and/or the control system 22 may perform logic that identifies the rotation sequence with a minimum number of transitions needed to place the object into the desired orientation.

In block 630, the method 600 involves operating the re-orienting apparatus 28 to perform at least one rotation of the object such that the object is re-positioned in a desired orientation. For example, the re-orienting apparatus 28 may rotate the object about the pivot connection 52 via an associated rotational actuator and/or rotate the object using the rotating base 50 via an associated rotational actuator. In block 640, the method 600 involves operating a pushing mechanism 29 to transfer the object from the re-orienting apparatus 28 to a downstream apparatus 30 such as, for example, a conveyor, a storage receptacle, a mobile robotic platform, and/or the like. In some embodiments, the method 600 may involve operating the roller mechanisms 46 to rotate the wheels and/or rollers to transfer the object from the re-orienting apparatus 28 to the downstream apparatus 30.

As noted, the re-orienting apparatus 28 may be used in logistics network operations to load, re-orient, and shift/transfer objects, such as parcels, in furtherance of routing the parcels to designated destinations within the logistics network operations and/or to recipients at delivery points. As an illustrative example, the re-orienting apparatus 28 may acquire a parcel from a source, such as a package car, mobile trailer, shelving unit, or storage receptacle, and/or the like, and may be used to re-orient the parcel into a desired orientation where the dimensions of the parcel (e.g., height, width, and/or length) are aligned such that the parcel is resting on a correct side for processing by a downstream apparatus 30 such as a conveyor, loading mechanism, dropping mechanism, mobile robotic platform, and/or the like. In another illustrative example, the re-orienting apparatus 28 may be used to re-orient an object into a desired orientation that is suitable for loading the object through an opening of a component, such as a mobile robotic platform, that can then transfer the object to a downstream location to facilitate a last-distance delivery. Accordingly, the re-orienting apparatus 28 may provide the ability in various embodiments to re-orient objects to allow for automated or semi-automated transfer of such objects where the improper orientation of the objects would otherwise cause inefficiencies or require manual intervention to correct the orientation.

Example Processes

Figure 7A:
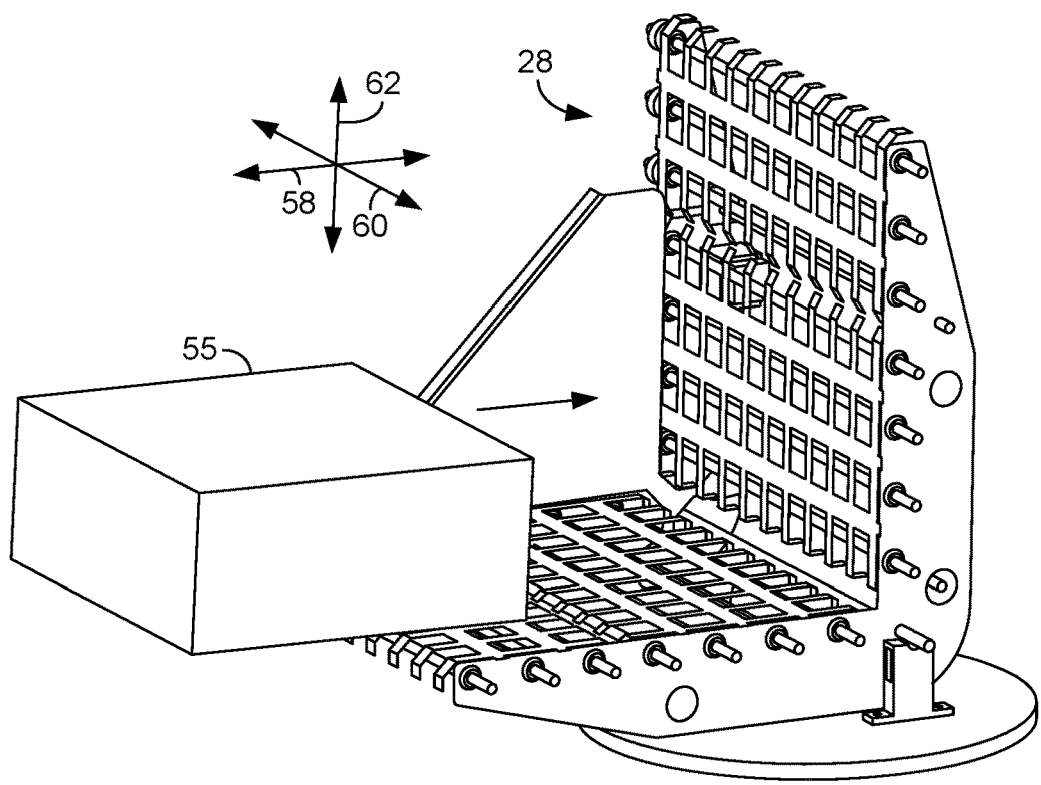
FIGS. 7A-7F depict an example process of re-orienting an object in accordance with various embodiments of the present disclosure.

Looking now at FIGS. 7A-7F, an example process for re-orienting an object 55 in accordance with various embodiments of the present disclosure is shown. Here, a loading apparatus 26, such as a conveyor, is used in transferring the object 55, in this case a box, onto a re-orienting apparatus 28 as shown in FIG. 7A. The object 55 may be transferred onto the re-orienting apparatus 28 in any number of different initial orientations. Therefore, the process may involve performing a rotation sequence to re-orient the object 55 into a desired orientation.

Figure 7B:
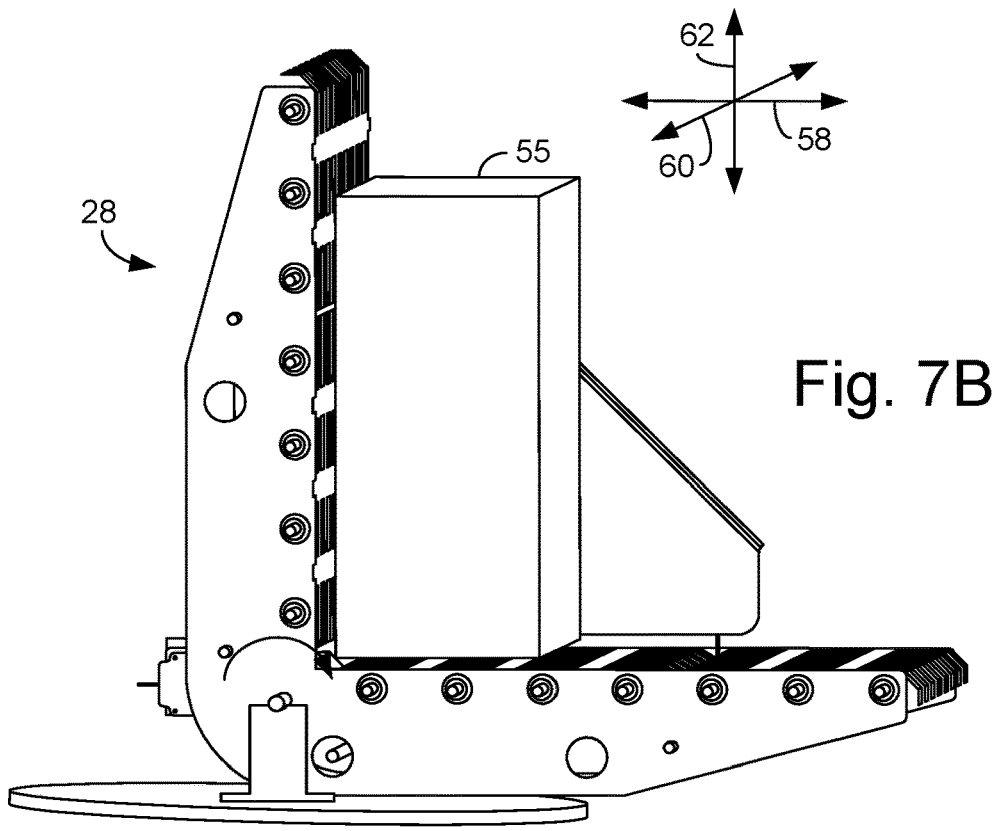

For example, a control system 22 may operate the re-orienting apparatus 28 to actuate roller mechanisms 46 through the operation of rotational drive units to position the object 55 in the corner of the re-orienting apparatus 28 for engagement by a pushing mechanism 29, as shown in FIG. 7A. Additionally, or alternatively, the control system 22 may operate the re-orienting apparatus 28 to rotate about a pivot-connection 52 through the operation of an attached rotational actuator to allow the frame 42 of the re-orienting apparatus 28 to rotate generally about the axis 60 and re-orient the object 55 accordingly, as shown in FIG. 7B.

Figure 7C:
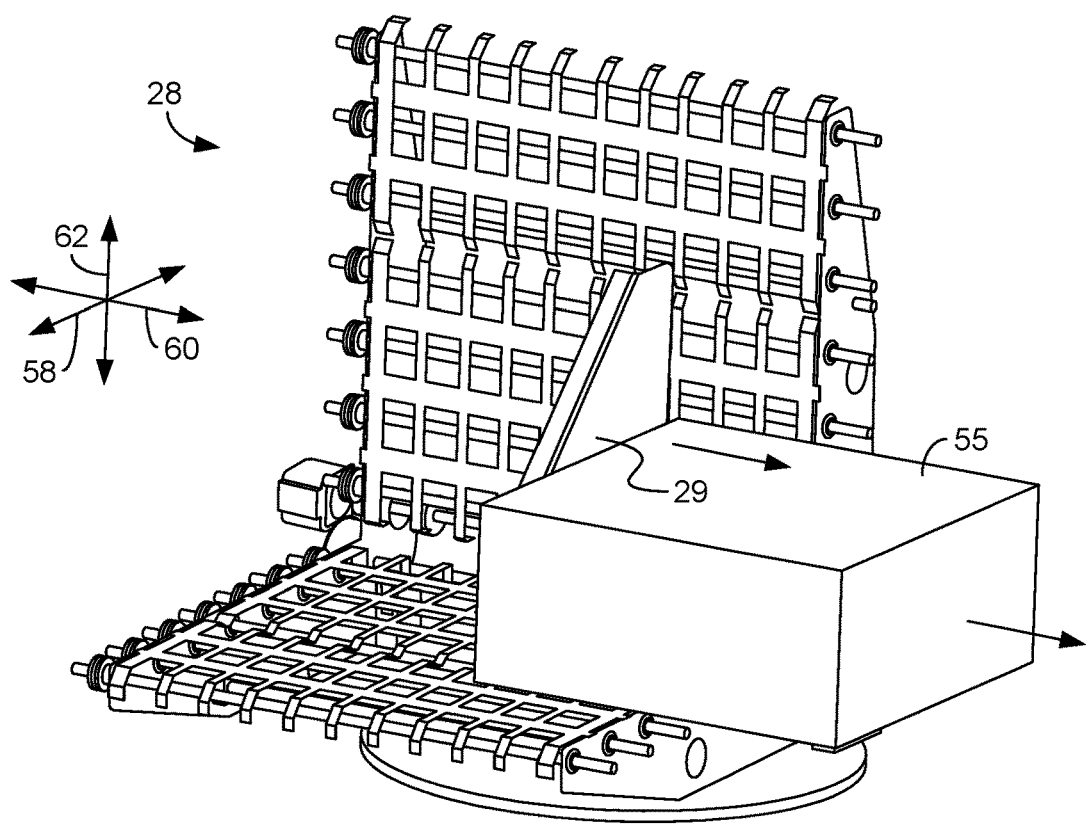

The control system 22 may then operate the re-orienting apparatus 28 to actuate the pushing mechanism 29 through operation of an actuator to extend a pushing structure 25 of the pushing mechanism 29 generally along the axis 60 to linearly shift the object 55, as shown in FIG. 7C, and transfer the object 55 off of the re-orienting apparatus 28 and onto or into a downstream apparatus 30, such as, for example, a conveyor, a handling device, a mobile robotic platform, and/or the like, to facilitate routing and/or processing of the object 55. Additionally, or alternatively, the control system 22 may operate the re-orienting apparatus 28 to actuate a rotating base 50 through operation of an actuator to rotate the frame 42 of the re-orienting apparatus 28 about an axis 62.

Figure 7D:
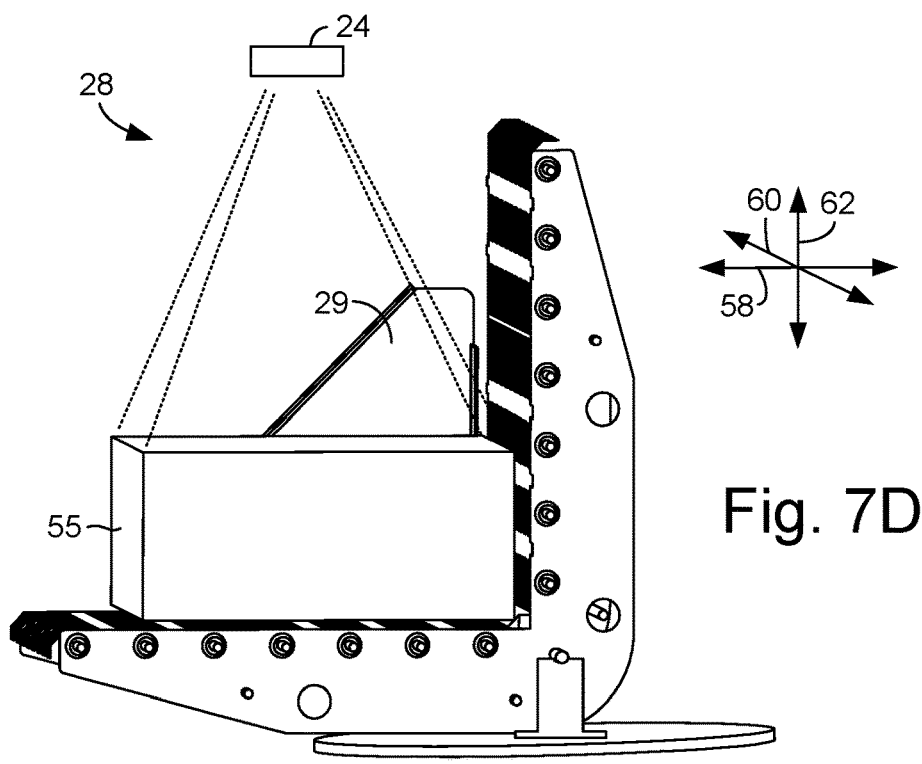

In particular embodiments, a metrology system 24 may be used to identify characteristics of the object 55 once the object 55 is positioned on the re-orienting apparatus 28, as shown in FIG. 7D. For example, the metrology system 22 may be used to identify characteristics such as the object's orientation, dimensions, position, position relative to elements of the re-orienting apparatus 28, and/or the like. In some embodiments, the metrology system 24 may determine the dimensions of the object 55 by comparing a profile of the object 55 to known points on the re-orienting apparatus 28 to allow for the determination of dimensions by relative comparison. Additionally, or alternatively, the metrology system 24 may detect whether the object 55 is flush against the corner of the re-orienting apparatus 28 such that the object 55 is against the pushing mechanism 29. Additionally, or alternatively, the metrology system 24, in conjunction with the control system 22, may identify a rotation sequence for the object 55 based at least in part on an initial orientation of the object 55 and a desired orientation of the object 55.

Figure 7E:
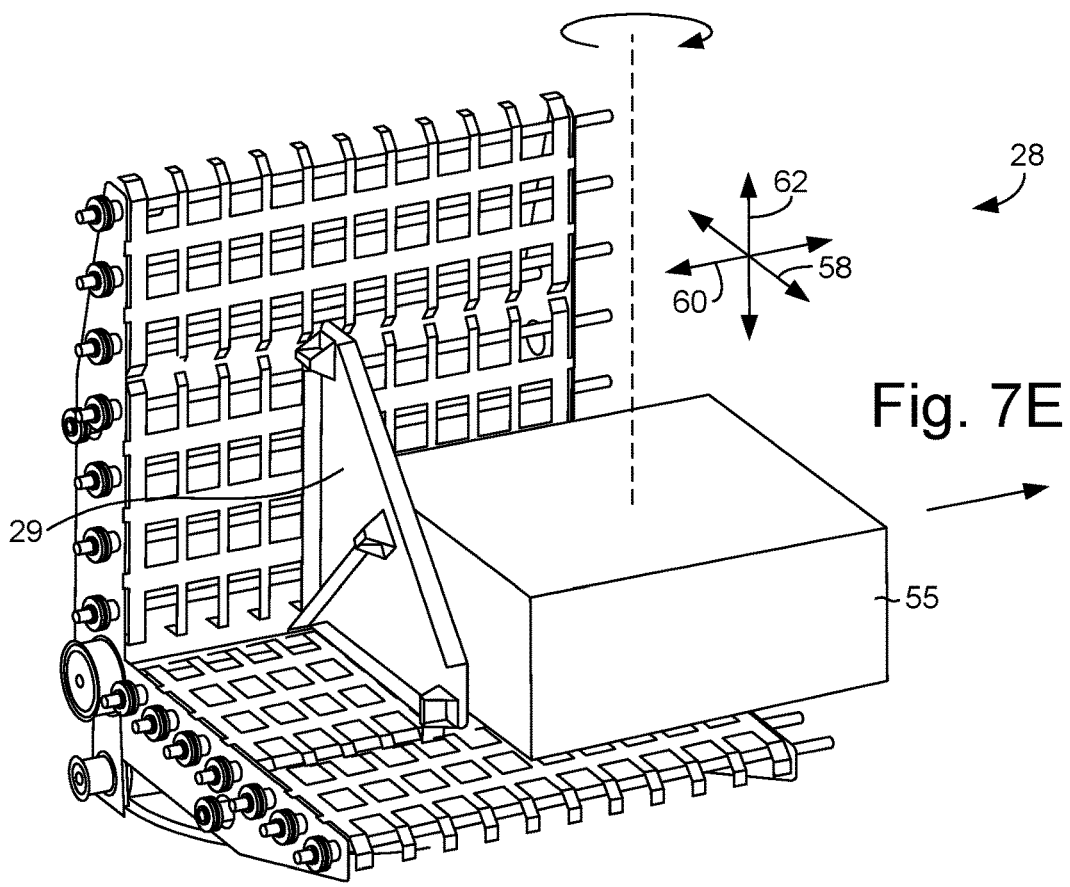
Figure 7F:
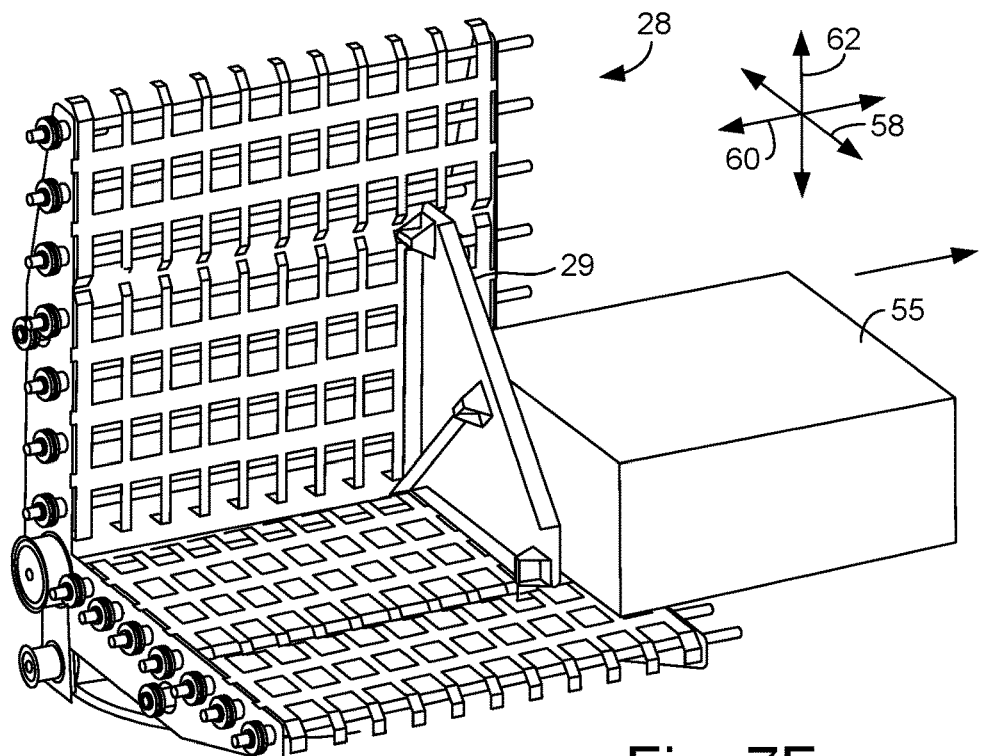

For example, the metrology system 24 and/or control system 22 may identify a rotation sequence and the control system 22 may operate the re-orienting apparatus 28, based at least in part on the identified rotation sequence, to perform a pivot rotation (e.g., 90 to 360 degrees) about the axis 62 to adjust the object 55 into a different orientation, as shown in FIG. 7E. Following the rotation, the control system 22 may then operate the re-orienting apparatus 28 to transfer the object 55 off of the re-orienting apparatus 28 by actuating the pushing mechanism 29, as shown in FIG. 7F. Additionally, or alternatively, the control system 22 may operate the re-orienting apparatus 28 to actuate the roller mechanisms 46 to transfer the object 55 off of the re-orienting apparatus 28.

Figure 8A:
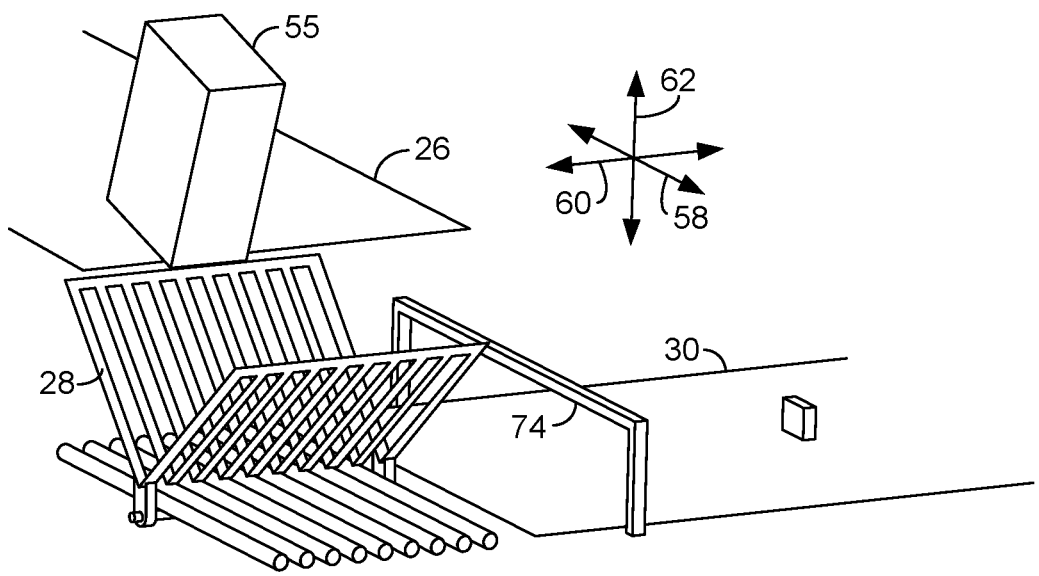
FIGS. 8A-8E depict an example process of re-orienting an object in accordance with various embodiments of the present disclosure.
Figure 8B:
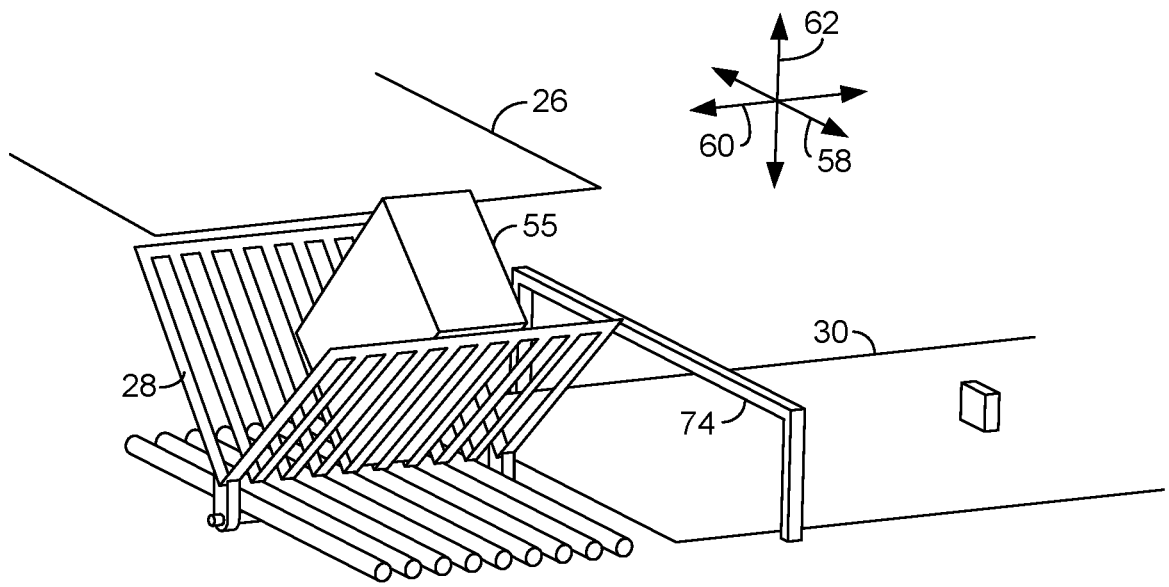

Looking now at FIGS. 8A-8E, another example process for re-orienting an object 55 in accordance with various embodiments of the present disclosure is shown. In this example, a re-orienting apparatus 28 is positioned adjacent to a loading apparatus 26 (e.g., a conveyor apparatus or another object-loading apparatus). Initially, the process involves the loading apparatus 26 transferring the object 55 onto the re-orienting apparatus 28 in any number of different orientations. For example, the loading apparatus 26 may transfer the object 55 from an elevated position in relation to the re-orienting apparatus 28 to utilize gravity, as shown in FIG. 8A. In this manner, the object 55 is dropped onto the re-orienting apparatus 28 upon transfer, as shown in FIG. 8B.

Figure 8C:
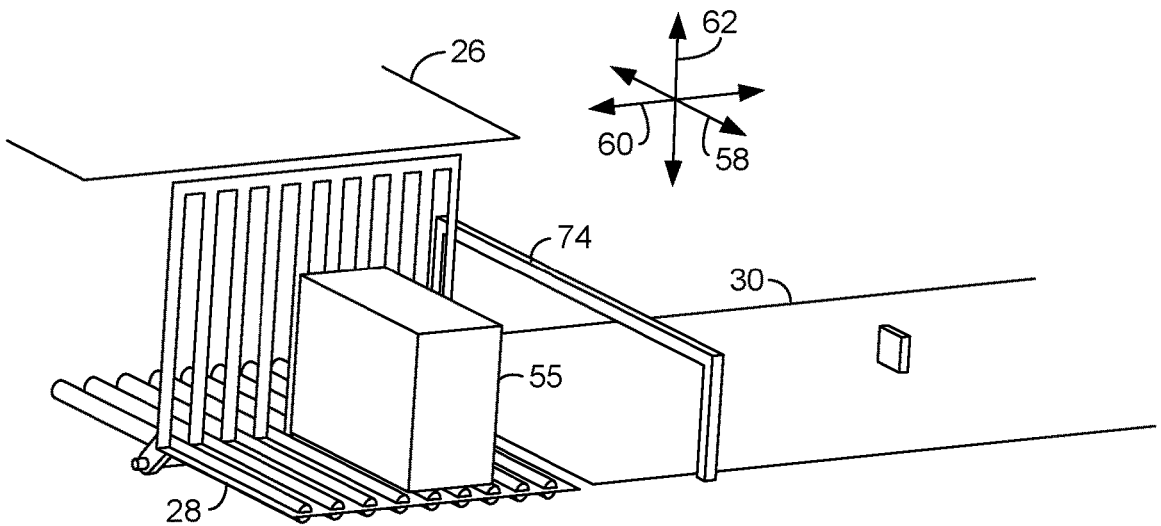
Figure 8D:
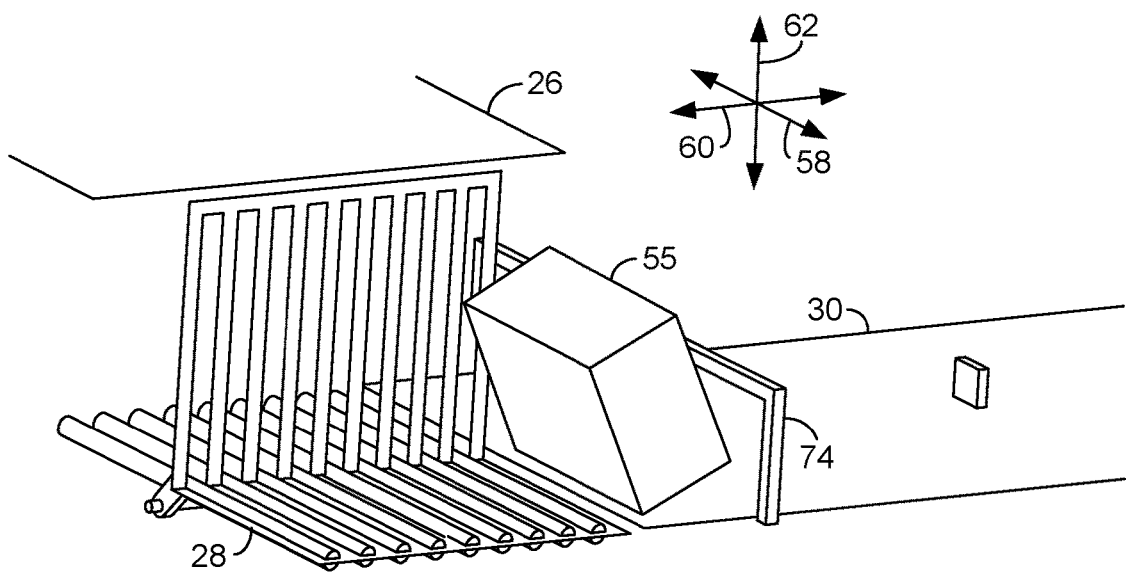
Figure 8E:
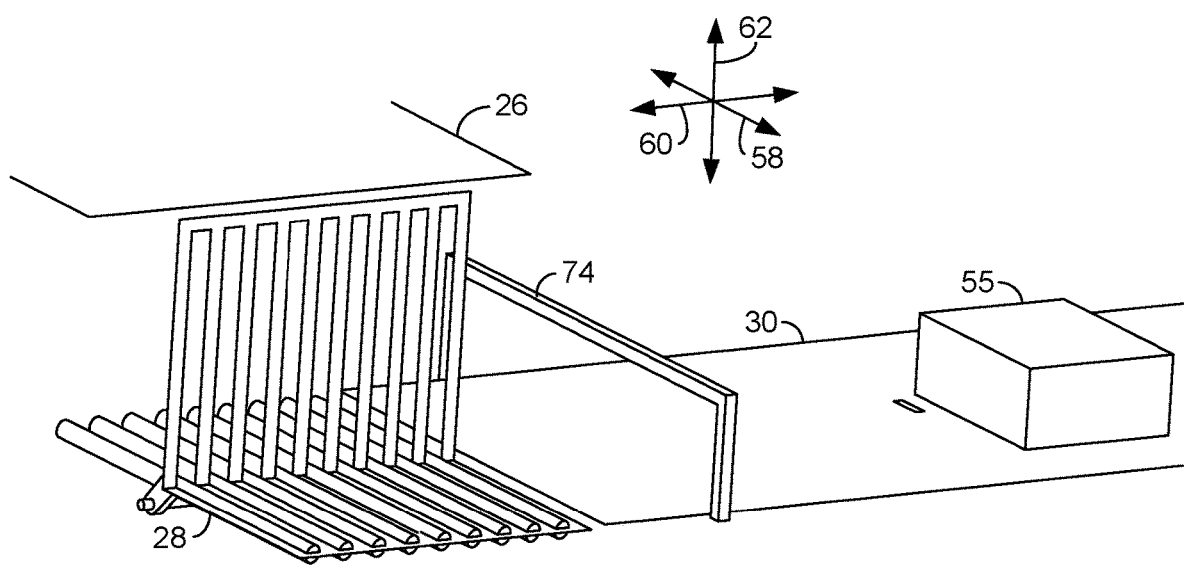

A control system 22 may operate the re-orienting apparatus 28 to rotate the object 55 (e.g., 90 degrees) about the axis 60, as shown in FIG. 8C. Additionally, or alternatively, the control system 22 may operate the re-orienting apparatus 28 to actuate roller mechanisms 46 to transfer the object 55 from the re-orienting apparatus 28 to a downstream apparatus 30 such as a conveyor or other object-routing apparatus, as shown in FIG. 8D. Here, a bump bar 74 (e.g., which may be adjustable in height and/or position as needed) may be located adjacent to the downstream apparatus 30 to facilitate an additional rotation of the object 55, as shown in FIG. 8D, to facilitate placing the object 55 into a final desired orientation, as shown in FIG. 8E. Accordingly, the process may involve performing additional rotations on the object 55, either using various embodiments and/or techniques described herein and/or using conventional techniques, to allow the object 55 to be placed into the desired orientation as needed throughout the object-routing process.

Figure 9:
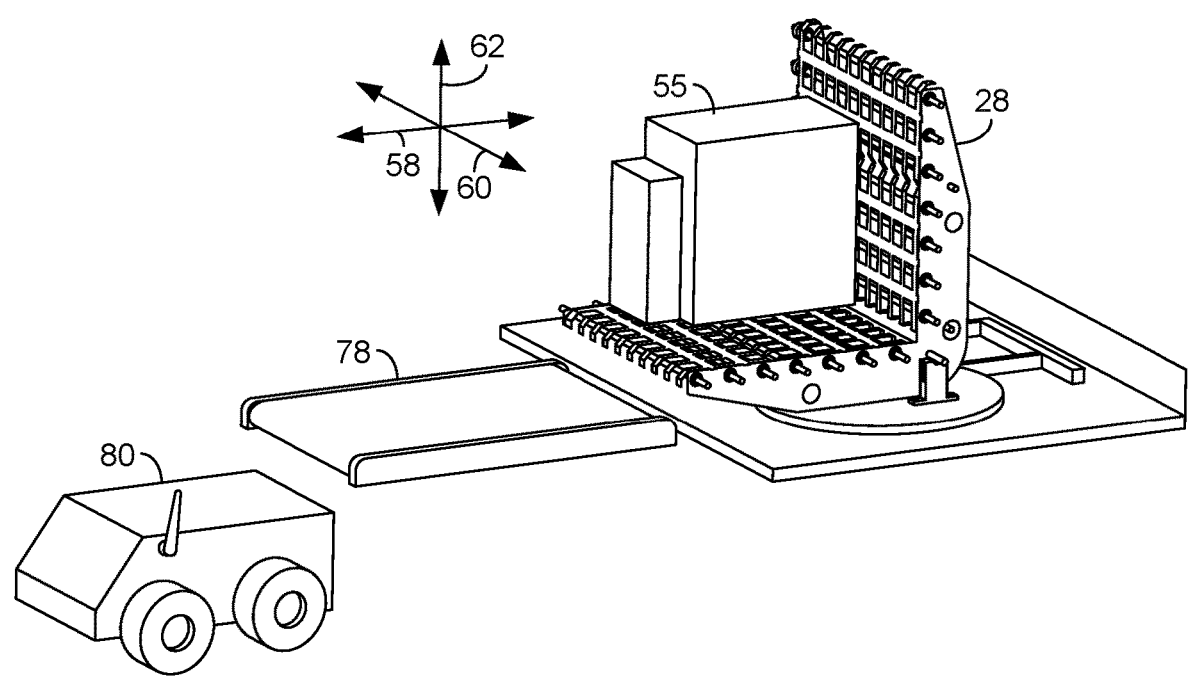
FIG. 9 depicts an example system for re-orienting objects that is manipulating an object for subsequent loading into a mobile robotic platform in accordance with various embodiments of the present disclosure.

Looking now at FIG. 9, yet another example process for re-orienting an object 55 for subsequent loading into/onto a downstream apparatus 30, in this instance, a mobile robotic platform 80, in accordance with various embodiments of the present disclosure is shown. Here, the process involves positioning the re-orienting apparatus 28 within a space such as a vehicle, facility, or other location to assist in loading the object 55 into/onto the mobile robotic platform 80. In addition, the process involves placing a second downstream apparatus 30, in this stance, a conveyor 78, adjacent to the re-orienting apparatus 28. The process is carried out by a control system 22 operating the re-orienting apparatus 28 to perform one or more transitions of the object 55 loaded thereon to achieve a desired orientation of the object 55 prior to the transfer of the object 55 onto the conveyor 78. Once in the desired orientation on the conveyor 78, the process involves the control system 22 operating the conveyor 78 to transfer the object 55 into/onto the mobile robotic platform 80, as shown in FIG. 9. This transfer of the object 55 at the desired orientation may allow for proper loading/insertion of the object 55 into/onto the mobile robotic platform 80 to facilitate smooth and aligned transitioning of the object 55 between mechanized systems.

Conclusion

Various embodiments described herein can be used in different applications in addition to logistics network operations and/or object delivery operations. For example, various embodiments described herein may be used for filling shipping containers, shifting/transferring raw materials, shifting/transferring food for packaging, loading and/or unloading individual lockers in connection with an automated storage and retrieval system (ASRS), and/or the like. In addition, various embodiments described herein may be utilized individually and/or in different combinations to facilitate the transfer loading of objects, and/or re-orienting of objects from initial orientations to desired orientations, as well as facilitate downstream routing of objects at appropriate times and/or locations.

Embodiment 1: A re-orienting apparatus comprising: a base rotatable about a first axis of rotation; a frame coupled to the base, wherein the frame comprises a plurality of angled support structures and is rotatable in different orientations about a second axis of rotation that is substantially perpendicular to the first axis of rotation; a first actuator coupled to the base and operable to rotate the base about the first axis of rotation; a second actuator coupled to the frame and operable to rotate the frame about the second axis of rotation; and a pushing mechanism coupled to the plurality of angled support structures and operable to extend and retract a pushing structure across surfaces of the plurality of angled support structures.

Embodiment 2: The re-orienting apparatus of embodiment 1, further comprising a third actuator coupled to the pushing mechanism that is operable to impart a force to the pushing structure to extend and retract the pushing structure across the surfaces of the plurality of angled support structures.

Embodiment 3: The re-orienting apparatus of embodiment 1, further comprising a third actuator coupled to a lead screw, wherein the pushing structure is coupled to threads of the lead screw so that the third actuator is operable to rotate the lead screw to extend and retract the pushing structure across the surfaces of the plurality of angled support structures.

Embodiment 4: The re-orienting apparatus of any of embodiments 1 to 3, wherein each angled support structure of the plurality of angled support structures comprises an array of roller mechanisms, and each roller mechanism of the array of roller mechanisms comprises at least one of a powered wheel or a powered roller that protrudes through an opening of the surface of the angled support structure and is operable to shift an object in one or more directions across the surface of the angled support structure.

Embodiment 5: The re-orienting apparatus of any of embodiments 1 to 4, further comprising a pivot-connection located at a junction between each of the plurality of angled support structures, wherein the pivot-connection is configured to allow the frame to rotate through operation of the second actuator about the second axis of rotation.

Embodiment 6: The re-orienting apparatus of embodiment 5, further comprising a guide rail extending between ends of the pivot-connection, wherein the guide rail is configured to allow the pushing mechanism to operate to extend and retract the pushing structure across the surfaces of the plurality of angled support structures while being stabilized and linearly guided by the guide rail.

Embodiment 7: The re-orienting apparatus of any of embodiments 1 to 6, wherein the plurality of angled support structures is configured to pivot about the second axis to allow at least one of the plurality of angled support structures to rotate and lay substantially flat.

Embodiment 8: A system comprising: a loading apparatus; a re-orienting apparatus comprising: a base rotatable about a first axis of rotation, a frame coupled to the base, wherein the frame comprises a plurality of angled support structures and is rotatable in different orientations about a second axis of rotation that is substantially perpendicular to the first axis of rotation, and a pushing mechanism coupled to the plurality of angled support structures and operable to extend and retract a pushing structure across surfaces of the plurality of angled support structures; and a control system, wherein: the loading apparatus is configured to transfer an object onto the surfaces of the plurality of angled support structures, and the control system is configured to: instruct at least one of the base to rotate about the first axis of rotation or the frame to rotate about the second axis of rotation to place the object into a desired orientation, and upon placing the object in the desired orientation, instruct the pushing mechanism to extend the pushing structure across the surfaces of the plurality of angled support structures to shift the object off the surfaces.

Embodiment 9: The system of embodiment 8, wherein at least one angled support structure of the plurality of angled support structures comprises an array of roller mechanisms, and the control system is configured to instruct the array of roller mechanisms to shift the object in one or more directions across the surface of the angled support structure.

Embodiment 10: The system of embodiment 8 or 9, further comprising a metrology system proximate to the re-orientating apparatus and configured to detect an initial orientation of the object placed onto the surfaces of the plurality of angled support structures, wherein: at least one of the metrology system or the control system is configured to determine a rotation sequence for the object based at least in part on the initial orientation, and the control system instructs at least one of the base to rotate about the first axis of rotation or the frame to rotate about the second axis of rotation to place the object into the desired orientation based at least in part on the rotation sequence.

Embodiment 11: The system of any of embodiments 8 to 10, further comprising a bump bar coupled in spaced relation with the plurality of angled support structures, wherein the bump bar is positioned such that the object is tipped over by the bump bar once the object is shifted off the surfaces.

Embodiment 12: The system of any of embodiments 8 to 11, wherein at least one of the re-orienting apparatus or the control system is at least one of incorporated therein or integrated therewith a mobile transport for shifting the object off the surfaces into the mobile transport.

Embodiment 13: The system of any of embodiments 8 to 12, further comprising a mobile device configured to interact with the control system to direct operation of at least one of the loading apparatus or the re-orienting apparatus.

Embodiment 14: The system of any of embodiments 8 to 13, further comprising a mobile robotic platform, wherein the object is shifted off the surfaces and into or onto the mobile robotic platform.

Embodiment 15: A re-orienting apparatus comprising: a base rotatable about a first axis of rotation; a frame coupled to the base, wherein: the frame comprises a plurality of angled support structures, the frame is rotatable in different orientations about a second axis of rotation that is substantially perpendicular to the first axis of rotation, each angled support structure of the plurality of angled support structures comprises an array of roller mechanisms, and each roller mechanism of the array of roller mechanisms comprises at least one of a powered wheel or a powered roller that protrudes through an opening of a surface of the angled support structure and is operable to shift an object in one or more directions across the surface of the angled support structure; and a first actuator coupled to the base and operable to rotate the base about the first axis of rotation; and a second actuator coupled to the frame and operable to rotate the frame about the second axis of rotation.

Embodiment 16: The re-orienting apparatus of embodiment 15, further comprising a pushing mechanism coupled to the plurality of angled support structures and operable to extend and retract a pushing structure across the plurality of angled support structures.

Embodiment 17: The re-orienting apparatus of embodiment 16, further comprising a third actuator coupled to the pushing mechanism that is operable to impart a force to the pushing structure to extend and retract the pushing structure across the plurality of angled support structures.

Embodiment 18: The re-orienting apparatus of embodiment 16, further comprising a third actuator coupled to a lead screw, wherein the pushing structure is coupled to threads of the lead screw so that the third actuator is operable to rotate the lead screw to extend and retract the pushing structure across the plurality of angled support structures.

Embodiment 19: The re-orienting apparatus of any of embodiments 15 to 18, further comprising a pivot-connection located at a junction between each of the plurality of angled support structures, wherein the pivot-connection is configured to allow the frame to rotate through operation of the second actuator about the second axis of rotation.

Embodiment 20: The re-orienting apparatus of embodiment 19, further comprising a guide rail extending between ends of the pivot-connection, wherein the guide rail is configured to allow the pushing mechanism to operate to extend and retract the pushing structure across the plurality of angled support structures while being stabilized and linearly guided by the guide rail.

Embodiment 21: A system comprising: a loading apparatus; a re-orienting apparatus comprising: a base rotatable about a first axis of rotation, and a frame coupled to the base, wherein: the frame comprises a plurality of angled support structures, the frame is rotatable in different orientations about a second axis of rotation that is substantially perpendicular to the first axis of rotation, and each angled support structure of the plurality of angled support structures comprises an array of roller mechanisms; and a control system, wherein: the loading apparatus is configured to transfer an object onto surfaces of the plurality of angled support structures, and the control system is configured to: instruct at least one of the base to rotate about the first axis of rotation or the frame to rotate about the second axis of rotation to place the object into a desired orientation, and upon placing the object in the desired orientation, instruct the array of roller mechanisms for at least one angled support structure of the plurality of angled support structures to shift the object in one or more directions off the surfaces.

Embodiment 22: The system of embodiment 21, wherein the re-orienting apparatus comprises a pushing mechanism coupled to the plurality of angled support structures and operable to extend and retract a pushing structure across the surfaces of the plurality of angled support structures, and the control system is configured to instruct the pushing mechanism to extend the pushing structure across the surfaces of the plurality of angled support structures to shift the object off the surfaces.

Embodiment 23: The system of embodiment 21 or 22, further comprising a metrology system proximate to the re-orientating apparatus and configured to detect an initial orientation of the object placed onto the surfaces of the plurality of angled support structures, wherein: at least one of the metrology system or the control system is configured to determine a rotation sequence for the object based at least in part on the initial orientation, and the control system instructs at least one of the base to rotate about the first axis of rotation or the frame to rotate about the second axis of rotation to place the object into the desired orientation based at least in part on the rotation sequence.

Embodiment 24: The system of any of embodiments 21 to 23, further comprising a bump bar coupled in spaced relation with the plurality of angled support structures, wherein the bump bar is positioned such that the object is tipped over by the bump bar once the object is shifted off the surfaces.

Embodiment 25: The system of any of embodiments 21 to 24, further comprising a mobile device configured to interact with the control system to direct operation of at least one of the loading apparatus or the re-orienting apparatus.

Embodiment 26: The system of any of embodiments 21 to 25, further comprising a mobile robotic platform, wherein the object is shifted off the surfaces and into or onto the mobile robotic platform.

Embodiment 27: A method comprising: transferring, via a loading apparatus, an object onto a re-orienting apparatus, wherein the re-orienting apparatus comprises: a base rotatable about a first axis of rotation, a frame coupled to the base, the frame comprising a plurality of angled support structures and is rotatable in different orientations about a second axis of rotation that is substantially perpendicular to the first axis of rotation, and a pushing mechanism coupled to the plurality of angled support structures and operable to extend and retract a pushing structure across surfaces of the plurality of angled support structures; instructing, via a control system, at least one of the base to rotate about the first axis of rotation or the frame to rotate about the second axis of rotation to place the object into a desired orientation; and upon placing the object in the desired orientation, instructing, via the control system, the pushing mechanism to extend the pushing structure across the surfaces of the plurality of angled support structures to shift the object off the surfaces.

Embodiment 28: The method of embodiment 27, wherein at least one angled support structure of the plurality of angled support structures comprises an array of roller mechanisms, and the method further comprises instructing, via the control system, the array of roller mechanisms to shift the object in one or more directions across the surface of the angled support structure.

Embodiment 29: The method of embodiment 27 or 28, further comprising: detecting, via a metrology system proximate to the re-orienting apparatus, an initial orientation of the object placed onto the surfaces of the plurality of angled support structures; and determining, via at least one of the metrology system or the control system, a rotation sequence for the object based at least in part on the initial orientation, wherein instructing at least one of the base to rotate about the first axis of rotation or the frame to rotate about the second axis of rotation to place the object into the desired orientation is based at least in part on the rotation sequence.

Embodiment 30: The method of any of embodiments 27 to 29, further comprising tipping, via a bump bar coupled in spaced relation with the plurality of angled support structures, the object once the object is shifted off the surfaces.

Embodiment 31: The method of any of embodiments 27 to 30, wherein the object is shifted off the surfaces and into or onto a mobile robotic platform.

Embodiment 32: A non-transitory computer-readable medium storing computer-executable instructions that, when executed by computing hardware, configure the computing hardware to perform operations comprising: instructing a loading apparatus to transfer an object onto a re-orienting apparatus, wherein the re-orienting apparatus comprises: a base rotatable about a first axis of rotation, a frame coupled to the base, the frame comprising a plurality of angled support structures and is rotatable in different orientations about a second axis of rotation that is substantially perpendicular to the first axis of rotation, and a pushing mechanism coupled to the plurality of angled support structures and operable to extend and retract a pushing structure across surfaces of the plurality of angled support structures; instructing at least one of the base to rotate about the first axis of rotation or the frame to rotate about the second axis of rotation to place the object into a desired orientation; and upon placing the object in the desired orientation, instructing the pushing mechanism to extend the pushing structure across the surfaces of the plurality of angled support structures to shift the object off the surfaces.

Embodiment 33: The non-transitory computer-readable medium of embodiment 32, wherein at least one angled support structure of the plurality of angled support structures comprises an array of roller mechanisms, and the operations further comprise instructing the array of roller mechanisms to shift the object in one or more directions across the surface of the angled support structure.

Embodiment 34: The non-transitory computer-readable medium of embodiment 32 or 33, wherein the operations further comprise: detecting, via a metrology system proximate to the re-orienting apparatus, an initial orientation of the object placed onto the surfaces of the plurality of angled support structures; and determining a rotation sequence for the object based at least in part on the initial orientation, wherein instructing at least one of the base to rotate about the first axis of rotation or the frame to rotate about the second axis of rotation to place the object into the desired orientation is based at least in part on the rotation sequence.

Embodiment 35: The non-transitory computer-readable medium of any of embodiments 32 to 34, wherein the object is shifted off the surfaces and into or onto a mobile robotic platform.

This disclosure may include the language such as, for example, "at least one of [element A] or [element B]." This language may refer to one or more of the elements. For example, "at least one of A or B" may refer to "A," "B," or "A and B." In other words, "at least one of A or B" may refer to "at least one of A and at least one of B," or "at least one of either A or B." In addition, this disclosure may include the language, for example "[element A], [element B], and/or [element C]." This language may refer to either of the elements or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A re-orienting apparatus comprising:
   a base rotatable about a first axis of rotation;
   a frame coupled to the base, wherein the frame comprises a plurality of angled support structures and is rotatable in different orientations about a second axis of rotation that is substantially perpendicular to the first axis of rotation;
   an actuator coupled to the frame and operable to rotate the frame about the second axis of rotation; and a pushing mechanism coupled to the plurality of angled support structures and operable to extend and retract a pushing structure across surfaces of the plurality of angled support structures.

2. The re-orienting apparatus of claim 1, further comprising a second actuator coupled to the pushing mechanism that is operable to impart a force to the pushing structure to extend and retract the pushing structure across the surfaces of the plurality of angled support structures.

3. The re-orienting apparatus of claim 1, further comprising a second actuator coupled to a lead screw, wherein the pushing structure is coupled to threads of the lead screw so that the second actuator is operable to rotate the lead screw to extend and retract the pushing structure across the surfaces of the plurality of angled support structures.

4. The re-orienting apparatus of claim 1, wherein each angled support structure of the plurality of angled support structures comprises an array of roller mechanisms, and each roller mechanism of the array of roller mechanisms comprises at least one of a powered wheel or a powered roller that protrudes through an opening of a surface of the angled support structure and is operable to shift an object in one or more directions across the surface of the angled support structure.

5. The re-orienting apparatus of claim 1, further comprising a pivot-connection located at a junction between each of the plurality of angled support structures, wherein the pivot-connection is configured to allow the frame to rotate through operation of the actuator about the second axis of rotation.

6. The re-orienting apparatus of claim 5, further comprising a guide rail extending between ends of the pivot-connection, wherein the guide rail is configured to allow the pushing mechanism to operate to extend and retract the pushing structure across the surfaces of the plurality of angled support structures while being stabilized and linearly guided by the guide rail.

7. The re-orienting apparatus of claim 1, wherein the plurality of angled support structures is configured to pivot about the second axis of rotation to allow at least one of the plurality of angled support structures to rotate and lay substantially flat.

8. A system comprising:
a loading apparatus;
a re-orienting apparatus comprising:
a base rotatable about a first axis of rotation,
a frame coupled to the base, wherein the frame comprises a plurality of angled support structures and is rotatable in different orientations about a second axis of rotation that is substantially perpendicular to the first axis of rotation, and
a pushing mechanism coupled to the plurality of angled support structures and operable to extend and retract a pushing structure across surfaces of the plurality of angled support structures; and
a control system, wherein:
the loading apparatus is configured to transfer an object onto the surfaces of the plurality of angled support structures, and
the control system is configured to:
instruct at least one of the base to rotate about the first axis of rotation or the frame to rotate about the second axis of rotation to place the object into a desired orientation, and
upon placing the object in the desired orientation, instruct the pushing mechanism to extend the pushing structure across the surfaces of the plurality of angled support structures to shift the object off the surfaces.

9. The system of claim 8, wherein at least one angled support structure of the plurality of angled support structures comprises an array of roller mechanisms, and the control system is configured to instruct the array of roller mechanisms to shift the object in one or more directions across a surface of the at least one angled support structure.

10. The system of claim 8, further comprising a metrology system proximate to the re-orienting apparatus and configured to detect an initial orientation of the object placed onto the surfaces of the plurality of angled support structures, wherein:
at least one of the metrology system or the control system is configured to determine a rotation sequence for the object based at least in part on the initial orientation, and
the control system instructs at least one of the base to rotate about the first axis of rotation or the frame to rotate about the second axis of rotation to place the object into the desired orientation based at least in part on the rotation sequence.

11. The system of claim 8, further comprising a bump bar coupled in spaced relation with the plurality of angled support structures, wherein the bump bar is positioned such that the object is tipped over by the bump bar once the object is shift off the surfaces.

12. The system of claim 8, wherein at least one of the re-orienting apparatus or the control system is at least one of incorporated therein or integrated therewith a mobile transport for shifting the object off the surfaces into the mobile transport.

13. The system of claim 8, further comprising a mobile device configured to interact with the control system to direct operation of at least one of the loading apparatus or the re-orienting apparatus.

14. The system of claim 8, further comprising a mobile robotic platform, wherein the object is shift off the surfaces and at least one of into or onto the mobile robotic platform.

15. A re-orienting apparatus comprising:
a base rotatable about a first axis of rotation;
a frame coupled to the base, wherein:
the frame comprises a plurality of angled support structures,
the frame is rotatable in different orientations about a second axis of rotation that is substantially perpendicular to the first axis of rotation,
each angled support structure of the plurality of angled support structures comprises an array of roller mechanisms, and
each roller mechanism of the array of roller mechanisms comprises at least one of a powered wheel or a powered roller that protrudes through an opening of a surface of the angled support structure and is operable to shift an object in one or more directions across the surface of the angled support structure; and
an actuator coupled to the frame and operable to rotate the frame about the second axis of rotation.

16. The re-orienting apparatus of claim 15, further comprising a pushing mechanism coupled to the plurality of angled support structures and operable to extend and retract a pushing structure across the plurality of angled support structures.

17. The re-orienting apparatus of claim 16, further comprising a second actuator coupled to the pushing mechanism that is operable to impart a force to the pushing structure to extend and retract the pushing structure across the plurality of angled support structures.

18. The re-orienting apparatus of claim 16, further comprising a second actuator coupled to a lead screw, wherein the pushing structure is coupled to threads of the lead screw so that the second actuator is operable to rotate the lead screw to extend and retract the pushing structure across the plurality of angled support structures.

19. The re-orienting apparatus of claim 15, further comprising a pivot-connection located at a junction between each of the plurality of angled support structures, wherein the pivot-connection is configured to allow the frame to rotate through operation of a second actuator about the second axis of rotation.

20. The re-orienting apparatus of claim 19, further comprising a guide rail extending between ends of the pivot-connection, wherein the guide rail is configured to allow a pushing mechanism to operate to extend and retract a pushing structure across the plurality of angled support structures while being stabilized and linearly guided by the guide rail.

* * * * *